(12) United States Patent
Hasegawa et al.

(10) Patent No.: US 9,916,569 B2
(45) Date of Patent: Mar. 13, 2018

(54) SHOPPING SUPPORT COMPUTING DEVICE

(71) Applicant: TOSHIBA TEC KABUSHIKI KAISHA, Tokyo (JP)

(72) Inventors: Keiichi Hasegawa, Tokyo (JP); Mahina Nakamura, Tokyo (JP); Maki Sato, Kanagawa (JP); Yumiko Okuma, Tokyo (JP); Yasutsugu Sasaki, Tokyo (JP); Tsuyoshi Gotanda, Tokyo (JP); Mina Kodama, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/625,903

(22) Filed: Feb. 19, 2015

(65) Prior Publication Data
US 2015/0248656 A1   Sep. 3, 2015

(30) Foreign Application Priority Data
Mar. 3, 2014   (JP) .................................. 2014-041057

(51) Int. Cl.
*G06Q 20/00*   (2012.01)
*G06Q 20/20*   (2012.01)
*G06Q 30/06*   (2012.01)

(52) U.S. Cl.
CPC ......... *G06Q 20/202* (2013.01); *G06Q 20/209* (2013.01); *G06Q 30/06* (2013.01)

(58) Field of Classification Search
CPC ..... G06Q 50/00; G06Q 20/202; G06Q 20/209
USPC ............................................... 705/39, 44, 21
See application file for complete search history.

(56) References Cited

U.S. PATENT DOCUMENTS

| | | | |
|---|---|---|---|
| 9,043,196 B1* | 5/2015 | Leydon | G06F 3/04842 704/4 |
| 2014/0074675 A1* | 3/2014 | Calman | G06Q 40/12 705/35 |
| 2014/0279418 A1* | 9/2014 | Rubinstein | G06Q 40/00 705/39 |

FOREIGN PATENT DOCUMENTS

JP   2009059173   3/2009

* cited by examiner

*Primary Examiner* — Rokib Masud
(74) *Attorney, Agent, or Firm* — Patterson & Sheridan, LLP

(57) ABSTRACT

A computing device includes an operation unit configured to receive a first user input about an item to be purchased, a display unit configured to display a name of the item and an interface based on which a user can make a second user input about the user's preference of the item through the operation unit, and a communication unit configured to transmit data corresponding to the first and second user inputs to an external device configured to store information about items for sale and information about user preferences of the items.

9 Claims, 24 Drawing Sheets

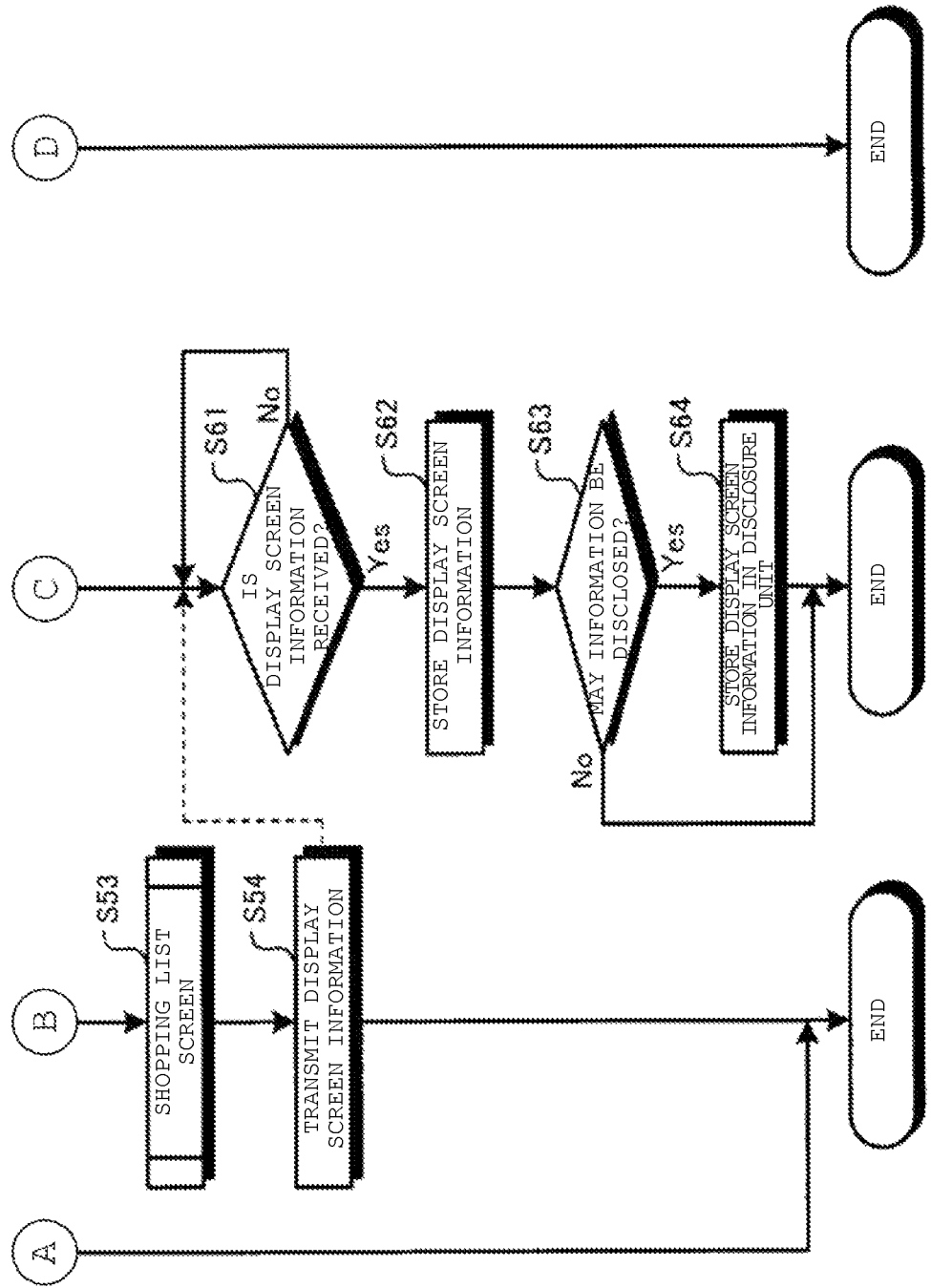

FIG. 21

```
           OO MART 2014-02-14      No.0011

MERCHANDISE A1    178 YEN

MERCHANDISE B     100 YEN

MERCHANDISE C     398 YEN

MERCHANDISE D     398 YEN

MERCHANDISE E1    248 YEN
```

A24 — (highlighted MERCHANDISE E1 row)

A30 — (👍 👎 ✌ icons)

FIG. 22

```
           OO MART 2014-02-14      No.0011

MERCHANDISE A1    178 YEN

MERCHANDISE B     100 YEN

MERCHANDISE C     398 YEN

MERCHANDISE D     398 YEN

MERCHANDISE E1    248 YEN
                         👍   — A31
                         (5)  — A36

TOTAL           1,322 YEN
    (SALES TAX OR THE LIKE INCLUDED
                       63 YEN)
    DEPOSIT         2,000 YEN
```

SHOPPING SUPPORT COMPUTING DEVICE

CROSS-REFERENCE TO RELATED APPLICATION

This application is based upon and claims the benefit of priority from Japanese Patent Application No. 2014-041057, filed Mar. 3, 2014, the entire contents of which are incorporated herein by reference.

FIELD

Embodiments described herein relate generally to a computing device displaying information about an item to be purchased or a purchased item.

BACKGROUND

In the related art, a system including a Point Of Sales (POS) terminal generates an electronic receipt instead of printing a paper receipt, and transmits the electronic receipt to a portable terminal of a customer who purchased items. One type of such a system stores purchase history of customers and creates a shopping list based on the purchase history.

Some customers may prefer to check information about an item to be purchased, such as rating, preference, and review of the item, before they buy the item.

DESCRIPTION OF THE DRAWINGS

FIGS. 11A and 11B are flowcharts of a process carried out by the customer terminal, the center server, and the store server.

FIGS. 21 and 22 illustrate an electronic receipt screen displayed on a customer terminal.

DETAILED DESCRIPTION

Embodiments provide a shopping support apparatus and a program that serves as a part of a system that evaluates a merchandise to be purchased.

In general, according to one embodiment, a computing device includes an operation unit configured to receive a first user input about an item to be purchased, a display unit configured to display a name of the item and an interface based on which a user can make a second user input about the user's preference of the item through the operation unit, and a communication unit configured to transmit data corresponding to the first and second user inputs to an external device configured to store information about items for sale and information about user preferences of the items.

According to another embodiment, a non-transitory computer readable medium comprising a program that is executable in a computing device to cause the computing device to perform a method for presenting an item to be purchased on a display unit of the computing device. The method includes receiving a first user input about an item to be purchased, displaying a name of the item on the display unit, displaying an interface based on which a user can make a second user input about the user's preference of the item, on the display unit, receiving the second user input, and transmitting data corresponding to the first and second user inputs to an external device configured to store information about items for sale and information about users' preference of the items.

Hereinafter, embodiments of a shopping support system and a program will be described in detail with reference to the accompanying drawings. The disclosure is not limited to the following embodiments.

Figure 1:
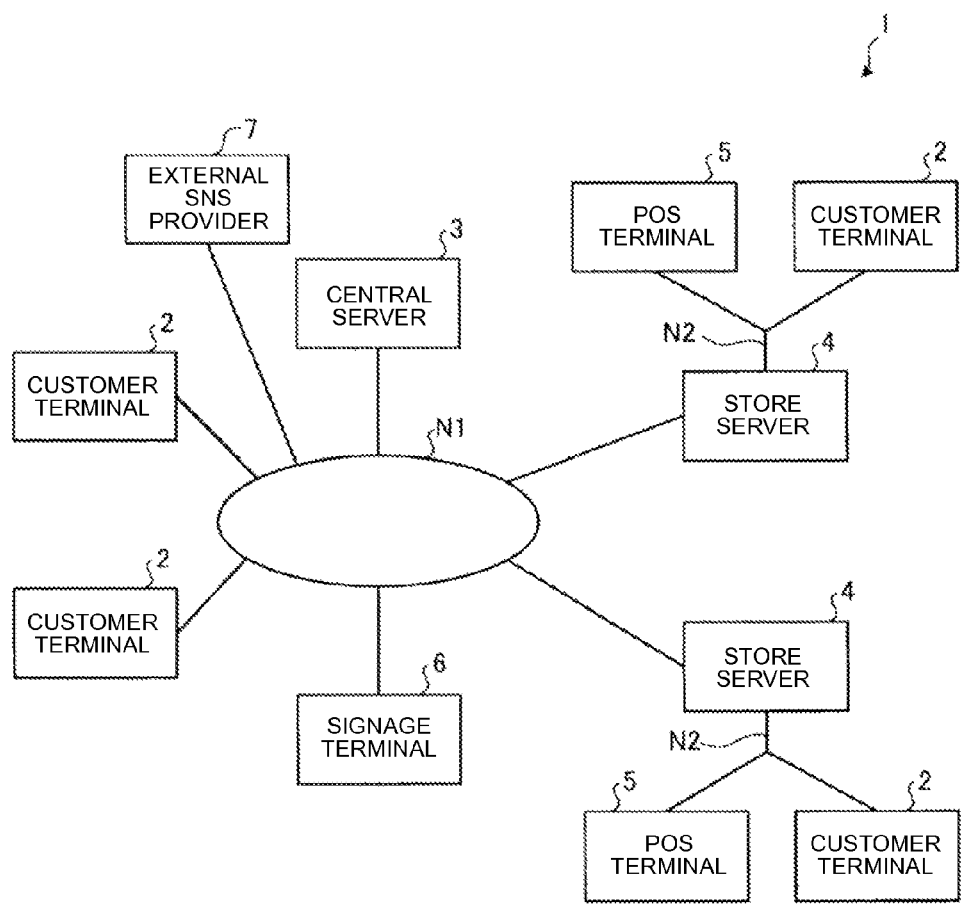
FIG. 1 illustrates a shopping support system according to an embodiment.

FIG. 1 illustrates a shopping support system 1 according to an embodiment. As shown in FIG. 1, the shopping support system 1 includes a customer terminal 2, a center server 3, a store server 4, a point of service (POS) terminal 5, a signage terminal 6, and an external social networking service (SNS) provider 7. The customer terminal 2, the store server 4, and the signage terminal 6 are, respectively, configured to be able to communicate with the center server 3 through a network N1 such as a public line or the Internet. Further, the store server 4, the POS terminal 5, and the customer terminal 2 are configured to be able to communicate with each other through a network N2 such as a LAN provided in a store. The number of each the customer terminal 2, the store server 4, the POS terminal 5, and the signage terminal 6 that form the shopping support system 1 is not limited to the example of FIG. 1.

The customer terminal 2, which is a shopping support device, is an information processing device such as a tablet terminal or a smart phone used by a user (customer). The customer terminal 2 supports creation of a shopping list (to be described later) in which purchase candidates (hereinafter, candidate items) are listed, in cooperation with the center server 3 or the like. Further, the customer terminal 2 performs a shopping support of the candidate items based on the shopping list, in cooperation with the store server 4 or the like.

The center server 3 is a server device located in a data center, for example. The center server 3 stores and manages a variety of data relating to customers and stores. Further, the center server 3 assists information exchange between the customer terminal 2 and the store server 4, or information exchange between the customer terminal 2 and the signage terminal 6. The number of stores (store server 4) or business entities connected to the center server 3 is not particularly limited. Further, the center server 3 transmits or receives information to or from the external SNS 7.

The store server 4 is a server device located in each store. The store server 4 executes a sales analysis according to a sales management or a sales strategy of merchandise to be sold in the store. Further, the store server 4 provides a variety of information such as an electronic coupon or an advertisement to the customer terminal 2 through the center server 3 or the like.

The POS terminal 5 is a merchandise sales data processing device located in each store. The POS terminal 5 registers the sales of merchandise purchased by a customer, and outputs purchase history information including the transaction content. The number of the POS terminals 5 in each store is not particularly limited.

The signage terminal 6 is a signage terminal that displays a digital signage. The signage terminal 6 is located in a train station or on the street, and displays a digital signage for advertisement of a specific store or merchandise.

The external SNS provider 7 is a provider that provides a service or a website for building a social network through communication on the Internet, which has a communication function or an electronic bulletin board function for a comment or the like. The external SNS provider 7 is able to communicate with the center server 3.

Next, configurations of the respective devices of the shopping support system 1 will be described.

Figure 2:
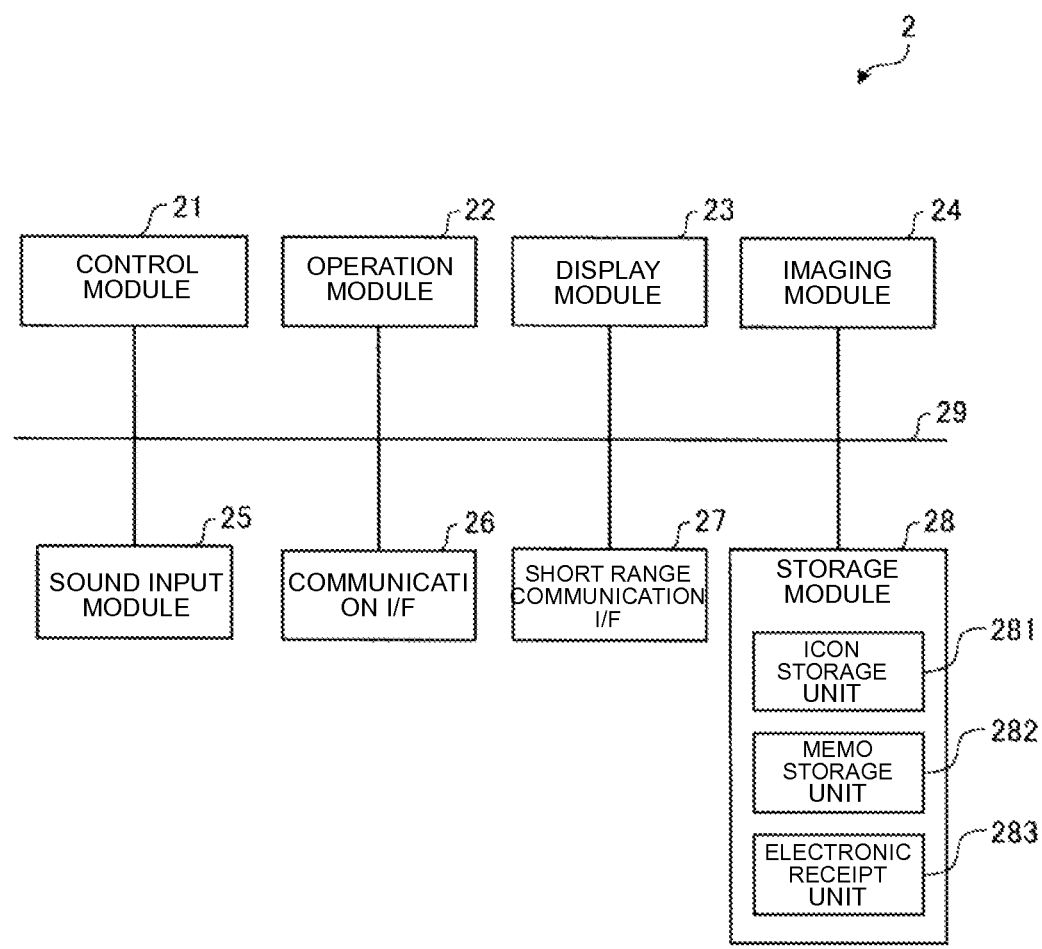
FIG. 2 illustrates functional blocks of a customer terminal of the system shown in FIG. 1.

First, configuration of the customer terminal 2 will be described with reference to FIG. 2. FIG. 2 illustrates the configuration of the customer terminal 2. As shown in FIG. 2, the customer terminal 2 includes a control module 21 that entirely controls various calculations or respective units of the customer terminal 2. The control module 21 is a computer including a central processing unit (CPU), a read only memory (ROM) that stores various programs and data, a random access memory (RAM), which is a main storage device, a real time clock (RTC) unit that counts the current date and time, and the like.

The control module 21 is connected to an operation module 22 and a display module 23 through a bus 29. The operation module 22 has operation keys or operation buttons for operation input. The display module 23 is, for example, a liquid crystal display or the like and displays a variety of information such as a name of an item that is a purchase candidate. The display module 23 may include a touch panel. In this case, the touch panel may function as the operation module 22.

Further, the control module 21 is connected to an imaging module 24 and a sound input module 25 through the bus 29. The imaging module 24 has an imaging element such as a charge coupled device (CCD) or a complementary metal-oxide semiconductor (CMOS), and images various objects. The sound input module 25 is a sound collection device such as a microphone, which receives a sound input.

Further, the control module 21 is connected through the bus 29 to a communication interface (I/F) 26 that is connectable to the network N1. The control module 21 is able to communicate with the center server 3 or the like using the communication I/F 26. Further, the control module 21 is connected to a short range communication I/F 27 that communicates based on standard of Near Field Communication (NFC) or the like. The control module 21 is able to communicate with a device capable of short range communication, such as the signage terminal 6, the POS terminal 5 or the like, using the short range communication I/F 27.

Further, the control module 21 is connected to a storage module 28 through the bus 29. The storage module 28 is an auxiliary storage device such as a hard disk drive (HDD) or a solid state drive (SSD). The storage module 28 stores various programs executed by the control module 21, and a variety of data such as purchase schedule information, additional information, and display screen information.

The storage module 28 includes an icon storage unit 281, a memo storage unit 282, and an electronic receipt unit 283. The icon storage unit 281 stores a designated icon (FIG. 16) in association with an item. The memo storage unit 282 stores memo information displayed as a memo on a shopping list screen G1. The memo information stored in the memo storage unit 282 is updated when the memo is added. The electronic receipt unit 283 stores electronic receipt information transmitted from the center server 3.

Figure 3:
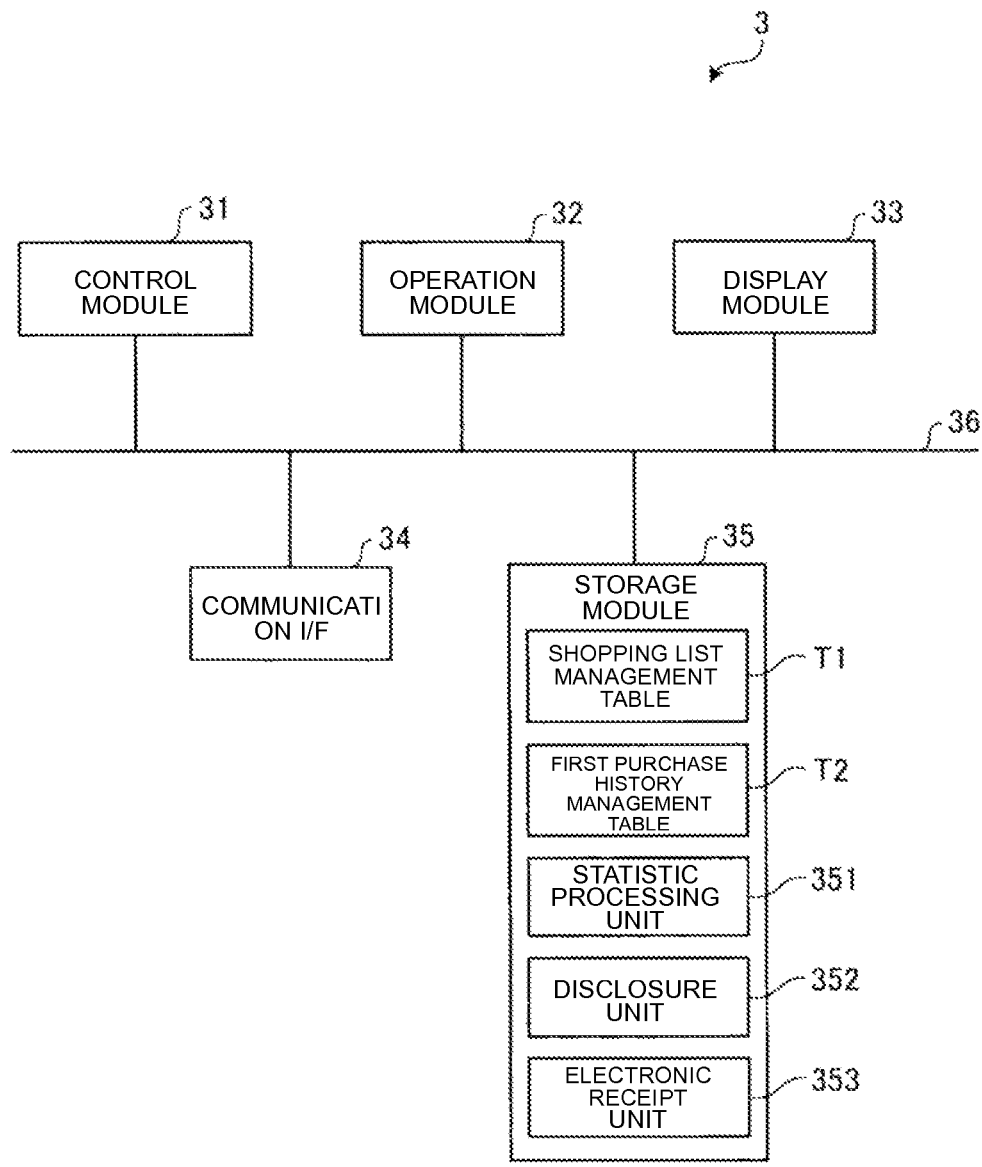
FIG. 3 illustrates functional blocks of a center server of the system shown in FIG. 1.

Next, the configuration of the center server 3 will be described with reference to FIG. 3. FIG. 3 illustrates the center server 3. The center server 3 includes a control module 31 that entirely controls various calculations or respective units of the center server 3. The control module 31 is a computer including a CPU, a ROM that stores various programs and data, a RAM, which is a main storage device, an RTC unit that counts the current date and time, and the like.

The control module 31 is connected to an operation module 32 and a display module 33 through a bus 36. The operation module 32 has a keyboard or a pointing device. The display module 33 is, for example, a liquid crystal display or the like, and displays a variety of information.

Further, the control module 31 is connected through the bus 36 to a communication interface (I/F) 34 that is connectable to the network N1. The control module 31 is able to communicate with the customer terminal 2, the store server 4, the signage terminal 6, or the like using the communication I/F 34.

In addition, the control module 31 is connected to a storage module 35 through the bus 36. The storage module 35 is an auxiliary storage device such as an HDD or an SDD, for example. The storage module 35 stores various programs executed by the control module 31 and a variety of data. Furthermore, the storage module 35 stores a shopping list management table T1 and a first purchase history management table T2 as data relating to customers and stores.

Figure 4:
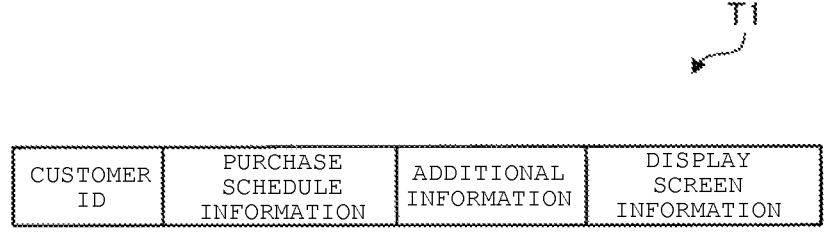
FIG. 4 illustrates data structure of a shopping list management table shown in FIG. 3.

FIG. 4 illustrates the shopping list management table T1. As shown in FIG. 4, in the shopping list management table T1, purchase schedule information, additional information, display screen information, and the like, are stored in correlation with a customer ID. Here, the customer ID refers to identification information for identifying each customer. The customer ID is allocated to each customer in advance through a procedure of membership registration or the like.

The purchase schedule information includes a merchandise name of a candidate item, which is a purchase candidate, a merchandise ID, and the like. Here, the merchandise name may be a specific name (for example, XX milk or XX curry) that designates a specific item, or a general common name (for example, milk or curry) that does not specify a specific item but indicates a category of the item. The merchandise ID is identification information capable of identifying each item, such as a JAN code. The additional information refers to information associated with an item that is included in the purchase schedule information. The additional information includes, for example, an electronic coupon for offering a benefit such as discount and reward point, advertisement information for advertising a specific store or item, or the like. It is assumed that when the additional information is information associated with the specific candidate item, the additional information is stored in correlation with the candidate item.

The display screen information refers to information for producing (reproducing) a display state of the shopping list created on the display module 23 of the customer terminal 2. The display screen information includes information relating to a display layout or image data such as a handwritten character.

Figure 5:
FIG. 5 illustrates data structure of a first purchase history management table shown in FIG. 3.

FIG. 5 illustrates data structure of the first purchase history management table T2. As shown in FIG. 5, in the first purchase history management table T2, purchase history information is stored in correlation with a customer ID. The purchase history information refers to information indicating a history of items purchased by a customer corresponding to the customer ID. The purchase history information includes a store ID indicating a store at which the item has been purchased, the date and time (transaction date and time) when the purchase transaction is performed, and merchandise information (merchandise name, merchandise ID, unit price or the like) of each purchased item.

Further, in the first purchase history management table T2, comment information is stored in correlation with an item (merchandise ID) included in the purchase history information. Here, the comment information refers to a variety of information input (registered) by a customer with respect to a specific item (merchandise ID). For example, in the first purchase history management table T2, a comment, an evaluation, or the like, relating to the item are stored as the comment information.

Returning to FIG. 3, the storage module 35 includes a statistical processing unit 351, a disclosure unit 352, and an electronic receipt unit 353. The statistical processing unit 351 stores statistical data of sales information of items sold with the POS terminal 5. Further, the statistical processing unit 351 stores statistical data of memo information of merchandise information transmitted from the customer terminal 2.

Further, when an icon (see FIGS. 16 and 21) is selected for an item or a memo by a customer, the statistical processing unit 351 stores the number of the icons as statistical data. In addition, the statistical processing unit 351 stores statistical data, reputation data, evaluation data or the like of the item, which are collected from the external SNS 7. In the exemplary embodiment, the reputation data is stored for an item that is going to be purchased, and the evaluation data is stored for an item that has been already purchased, but the reputation data and the evaluation data may not be clearly distinguished. That is, "evaluation" includes the meanings of reputation and evaluation. Furthermore, "evaluation" also includes the meaning of an expectation degree.

The electronic receipt unit 353 stores electronic receipt information that is generated by the POS terminal 5 and is transmitted from the POS terminal 5. The electronic receipt information is stored with respect to each customer ID that specifies the customer. Here, the electronic receipt refers to computerized receipt information that is generated when one or more items are purchased at a store.

The electronic receipt information is generated by the POS terminal 5, and is transmitted to the center server 3. The center server 3 stores the received electronic receipt information, and transmits the electronic receipt information to the customer terminal 2 of the customer specified by the customer ID if there is a reference inquiry from the customer terminal 2. The customer terminal 2 displays the received electronic receipt on the display module 23.

The disclosure unit 352 stores shopping list information (see FIG. 17) that the customer allowed to be disclosed as display screen information. Further, the disclosure unit 352 stores electronic receipt information (see FIG. 22) that the customer allowed to be disclosed as the display screen information. The disclosure unit 352 arranges and stores the shopping list information and the electronic receipt information with respect to each category. Here, the category includes a gender, an age group, a geographic area, a merchandise classification, or the like, for example.

Figure 6:
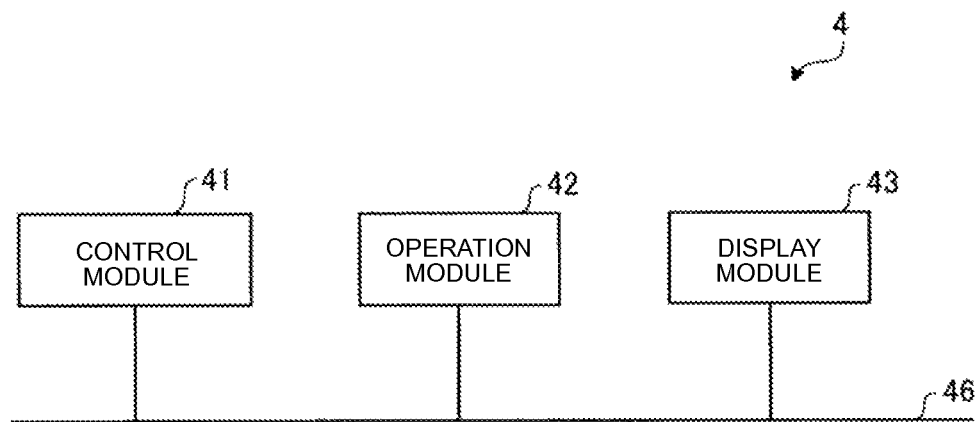
FIG. 6 illustrates functional blocks of a store server of the system shown in FIG. 1.

Next, configuration of the store server 4 will be described with reference to FIG. 6. The store server 4 includes a control module 41 that entirely controls various calculations or respective units of the store server 4. The control module 41 is a computer including a CPU, a ROM that stores various programs or data, a RAM, which is a main storage device, an RTC unit that counts the current date and time, and the like.

Further, the control module 41 is connected to an operation module 42 and a display module 43 through a bus 46. The operation module 42 has a keyboard or a pointing device. The display module 43 is, for example, a liquid crystal display or the like, and displays a variety of information.

Further, the control module 41 is connected through the bus 46 to a communication interface (I/F) 44 that is connectable to the network N1 and the network N2. The control module 41 is able to communicate with the center server 3, the POS terminal 5, or the like using the communication I/F 44.

In addition, the control module 41 is connected to a storage module 45 through the bus 46. The storage module 45 is an auxiliary storage device such as an HDD or an SSD. The storage module 45 stores various programs executed by the control module 41 and a variety of data. Furthermore, the storage module 45 stores a merchandise management table T3, a purchased merchandise management table T4, and a second purchase history management table T5.

In the merchandise management table T3, merchandise information or the like of each item is stored in correlation with a merchandise ID of the item. Here, the merchandise information includes a merchandise name or unit price of a corresponding item, and image data such as a photo or an illustration depicting the item. The merchandise name includes a specific name of the item, a general name such as a classification name and a category name to which the item belongs, and the like.

Figure 7:
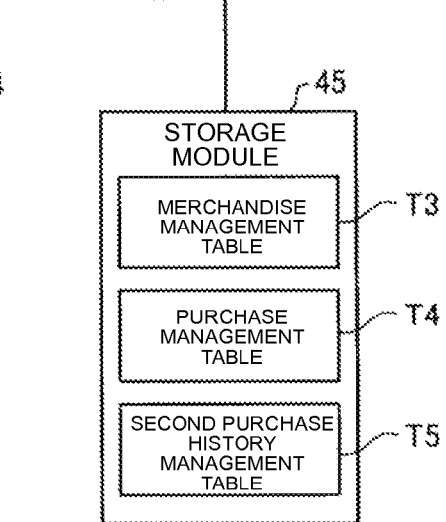
FIG. 7 illustrating data structure of a purchase merchandise management table shown in FIG. 6.

FIG. 7 illustrates data structure of the purchased merchandise management table T4. As shown in FIG. 7, in the purchased merchandise management table T4, visit date and time, purchase schedule information and the like are stored in correlation with a customer ID. Here, the visit date and time includes the date and time when a customer corresponding to the customer ID visited the store. Further, in the purchase merchandise management table T4, purchase completion information is stored in correlation with each candidate item in the purchase schedule information. Here, the purchase completion information refers to a flag or the like indicating whether or not a corresponding candidate item has been actually purchased.

Figure 8:
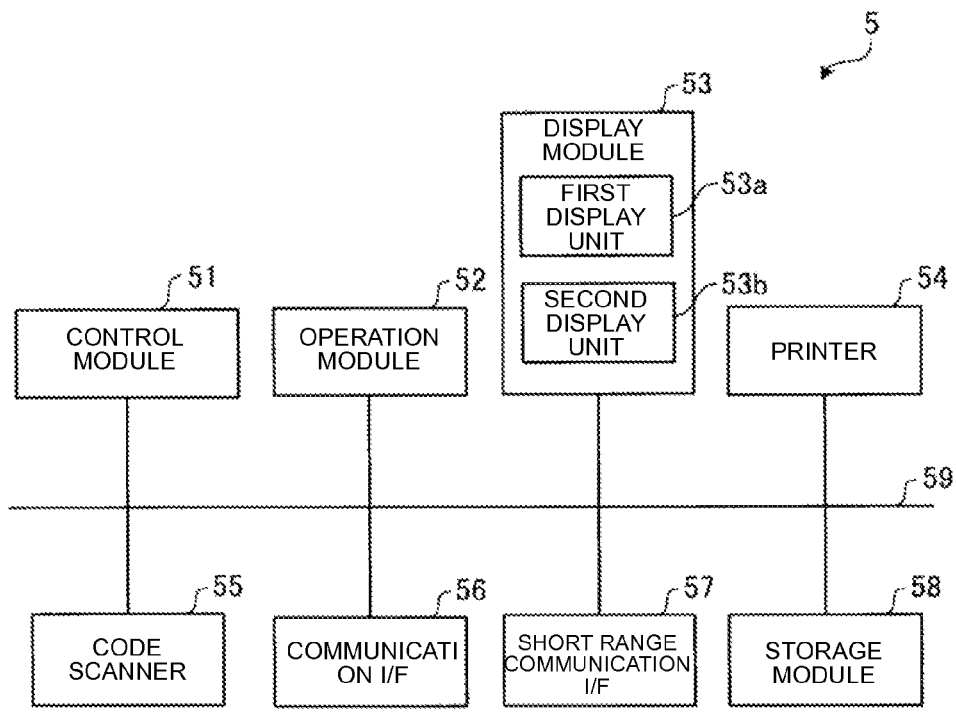
FIG. 8 illustrates functional blocks of a POS terminal of the system shown in FIG. 1.

Next, configuration of the POS terminal 5 will be described with reference to FIG. 8. FIG. 8 illustrates the POS terminal 5. As shown in FIG. 8, the POS terminal 5 includes a control module 51 that entirely controls various calculations or respective units of the POS terminal 5. The control module 51 is a computer including a CPU, a ROM that stores various programs or data, a RAM, which is a main storage device, an RTC unit that counts the current date and time, and the like.

Further, the control module 51 is connected to an operation module 52, a display module 53, a printer 54, and a code scanner 55 through a bus 59.

The operation module 52 has a variety of operation keys for operation input by an operator. As the operation keys, for example, numeric keys for input of numerical values, a cursor key or a selection determination key for selection of a predetermined item, a subtotal key for instruction of a total output of merchandises that are sales-registered, a settlement key for declaration of payment based on a settlement processing of one transaction, and the like are provided.

The display module 53 is a liquid crystal display or the like, and displays a variety of information such as a name and price of the sales-registered item, and a total price and a change sum of one transaction of which the payment is declared. The display module 53 includes a first display unit 53a that displays a variety of information for a cashier, and a second display unit 53b that displays a variety of information for a customer. The display module 53 may include a touch panel. In this case, the touch panel may function as the operation module 52.

The printer 54 is a printing device that prints a receipt, a journal, or the like. The code scanner 55 is a scanner device that optically reads a code symbol such as a barcode and a two-dimensional code. The code scanner 55 reads, for example, a code symbol attached to an item or a code symbol displayed on the customer terminal 2 and outputs the information associated with the code symbol to the control module 51. It is assumed that a merchandise ID or the like capable of identifying the item is associated with the code symbol that is attached to the item.

Further, the control module 51 is connected through the bus 59 to a communication I/F 56 that is connectable to the network N2. The control module 51 is able to communicate with the store server 4 or the like in the store using the communication I/F 56. Further, the control module 51 is connected to a short range communication I/F 57 that communicates based on standard of NFC or the like. The control module 51 is able to communicate with a device capable of using the short range communication, such as the customer terminal 2 or the like, using the short range communication I/F 57.

In addition, the control module 51 is connected to a storage module 58 through the bus 59. The storage module 58 is an auxiliary storage device such as an HDD and an SSD. The storage module 58 stores a program for executing various POS works including merchandise sales data processing or a variety of data therefor. Further, the storage module 58 stores a store ID or the like of the store in advance.

Figure 9:
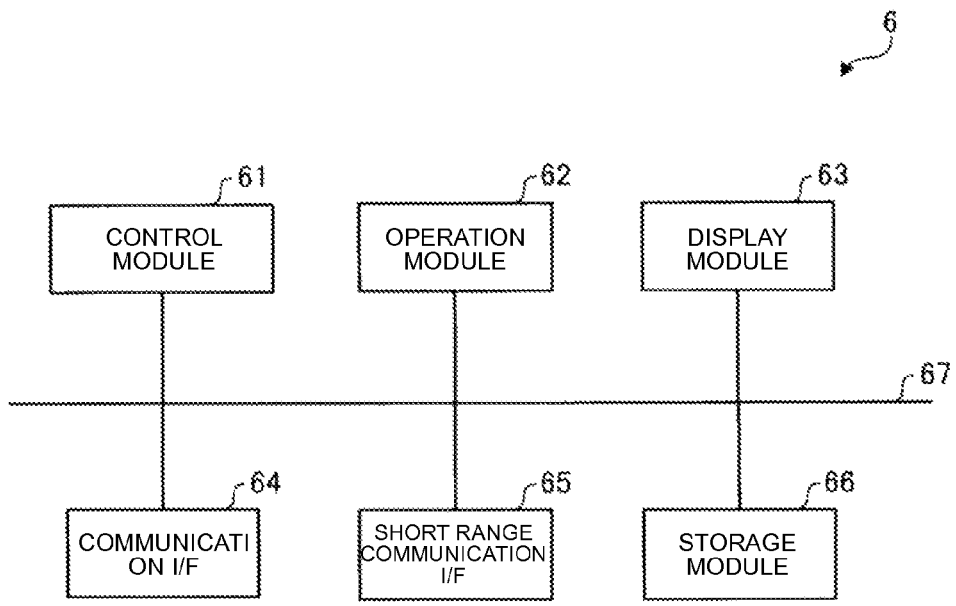
FIG. 9 illustrates functional blocks of a signage terminal of the system shown in FIG. 1.

Next, the configuration of the signage terminal 6 will be described with reference to FIG. 9. FIG. 9 illustrates the signage terminal 6. The signage terminal 6 includes a control module 61 that entirely controls various calculations or respective units of the signage terminal 6. The control module 61 is a computer including a CPU, a ROM that stores various programs or data, a RAM, which is a main storage device, an RTC unit that counts the current date and date, and the like.

Further, the control module 61 is connected to an operation module 62 and a display module 63 through a bus 67. The operation module 62 has a keyboard or a pointing device. The display module 63 is a liquid crystal display or the like, and displays a variety of information such as advertisement. The display module 63 may include a touch panel. In this case, the touch panel may function as the operation module 62.

In addition, the control module 61 is connected through the bus 67 to a communication interface (I/F) 64 that is connectable to the network N1. The control module 61 is able to communicate with the center server 3 or the like using the communication I/F 64. Furthermore, the control module 61 is connected to a short range communication I/F 65 that communicates based on standard of NFC or the like. The control module 61 is able to communicate with a device capable of using the short-range communication, such as the customer terminal 2, using the short range communication I/F 65.

Further, the control module 61 is connected to a storage module 66 through the bus 67. The storage module 66 is an auxiliary storage device such as a HDD and a SSD. The storage module 66 stores various programs executed by the control module 61 and a variety of data such as content data relating to a digital signage.

Next, a control process relating to memo information will be described with reference to FIGS. 10 to 19; the control process is achieved by the respective CPUs of the control module 21 of the customer terminal 2, the control module 31 of the center server 3, the control module 41 of the store server 4, and the control module 51 of the POS terminal 5 executing various programs.

First, a creation support process relating to creation of a shopping list having the memo information executed by the control module 21 will be described. The creation support process is a process of adding an icon indicating a reputation or an expectation degree of an item for the item that is input through the customer terminal 2. For ease of description, the process carried out by the control module 21 will be described in association with the control process carried out by the control module 31 and the control process carried out by the control module 41.

Figure 10:
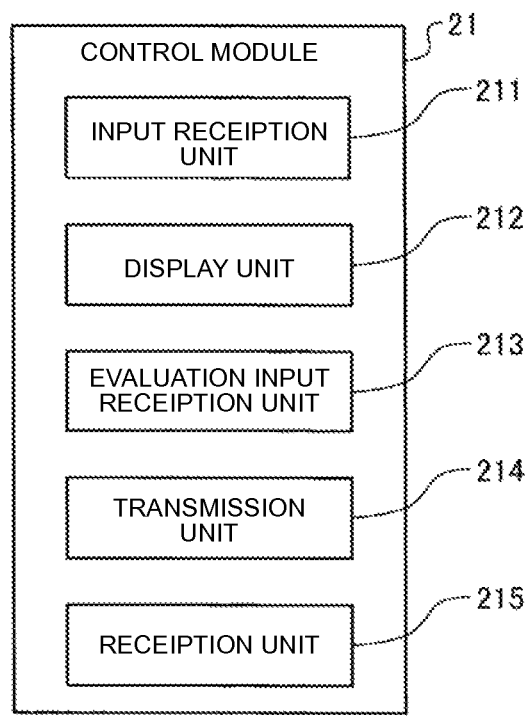
FIG. 10 is functional blocks of a control module of the customer terminal.

FIG. 10 illustrates functional blocks of the control module 21 of the customer terminal 2. As shown in FIG. 10, the control module 21 of the customer terminal 2 includes an input reception section 211, a display section 212, an evaluation input reception section 213, a transmission section 214, and a reception section 215.

The input reception section 211 has a function of receiving an input of merchandise information indicating an item.

The display section 212 has a function of displaying the merchandise information received by the input reception section 211 on the display module 23.

The evaluation input reception section 213 has a function of receiving an input of an evaluation of the item displayed on the display module 23.

The transmission section 214 has a function of transmitting the merchandise information received by the input reception section 211 to an external device (center server 3) together with the evaluation received by the evaluation input reception section 213.

The reception section 215 has a function of receiving statistical information that represents the evaluation of the merchandise, based on the merchandise information and the evaluation transmitted by the transmission section 214, from the external device (center server 3).

Figure 11A:
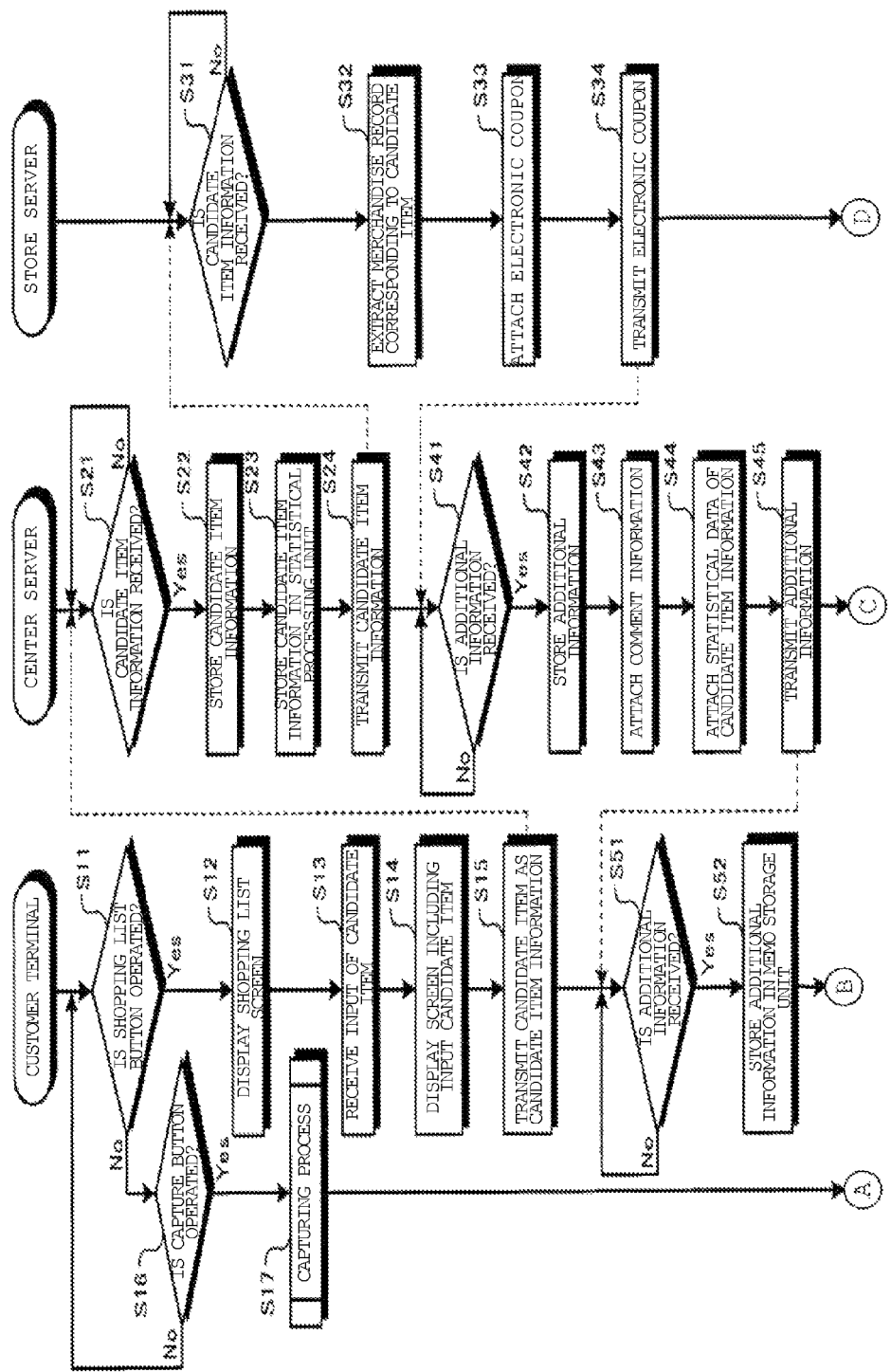

FIGS. 11A and 11B are flowcharts of the creation support process executed by the customer terminal 2. First, the control module 21 of the customer terminal 2 provides various graphical user interfaces (GUI) to an operator of the customer terminal 2.

Specifically, the control module 21 receives an input of memo information of a candidate item, which is a purchase candidate, and displays a shopping list screen for indicating the memo information on the display module 23. Here, it is assumed that a customer ID of the operator is input when the customer logs in to the center server 3 or the shopping list screen is displayed. Further, it is assumed that information (for example, IP address or the like) for accessing the customer terminal 2 is notified to the center server 3 together with the customer ID, according to the input of the customer ID.

Figure 13:
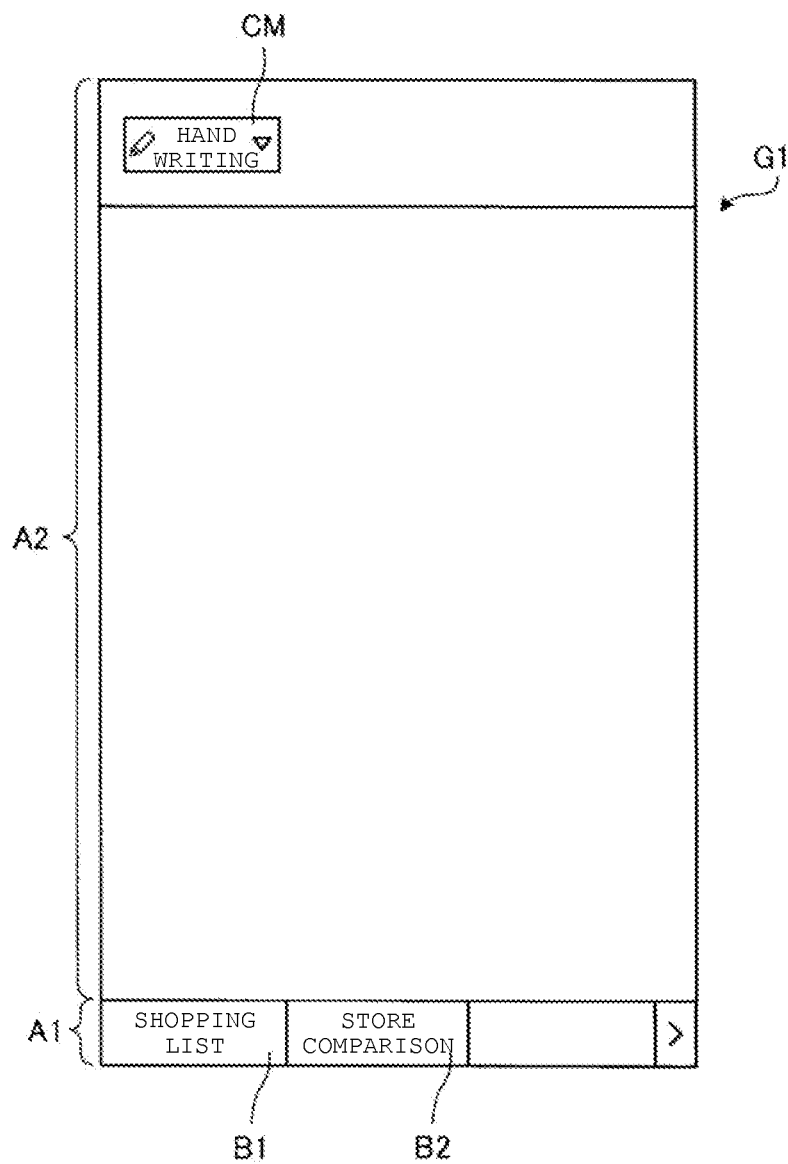
FIGS. 13-17 illustrate a shopping list screen.

FIG. 13 illustrates an example of a shopping list screen G1. As shown in FIG. 13, the control module 21 controls the display module 23 to display a first area A1 for switching a display mode and a second area A2 including various screens such as a shopping list screen G1.

The first area A1 has a shopping list button B1, a capture button B2, or the like for switching the display mode. The shopping list button B1 is a button to display the shopping list screen G1. The capture button B2 is a button to perform a capturing operation of the merchandise information.

The control module 21 determines whether not the shopping list button B1 is operated (step S11). Further, if it is determined that the shopping list button B1 is not operated (No in step S11), the control module 21 determines whether or not the capture button B2 is operated (step S16).

When the control module 21 determines that the shopping list button B1 is operated (Yes in step S11), the control module 21 displays the second area A2 that is capable of displaying the shopping list screen G1, as shown in FIG. 13 (step S12). Here, a change menu CM, which is a button for switching the input mode, is provided in the shopping list screen G1. The operator of the customer terminal 2 selects a desired input mode through the change menu CM, and then, inputs the memo information of the candidate item in the second area A2 by a method in accordance with the input mode.

The input mode to input the memo information includes an input mode based on sound (sound input mode), an input mode based on key typewriting (key input mode), an input mode based on reading of a code symbol (barcode or the like) (code input mode), an input mode based on image recognition (image input mode), or the like, in addition to the input mode based on handwriting (handwriting input mode) shown in FIG. 13.

If the memo information of the candidate item is received by a method in accordance with the selected input mode (S13), the control module 21 displays the candidate item on the shopping list screen G1 (step S14). The input candidate item may be a specific name or a general name of the item.

Figure 14:
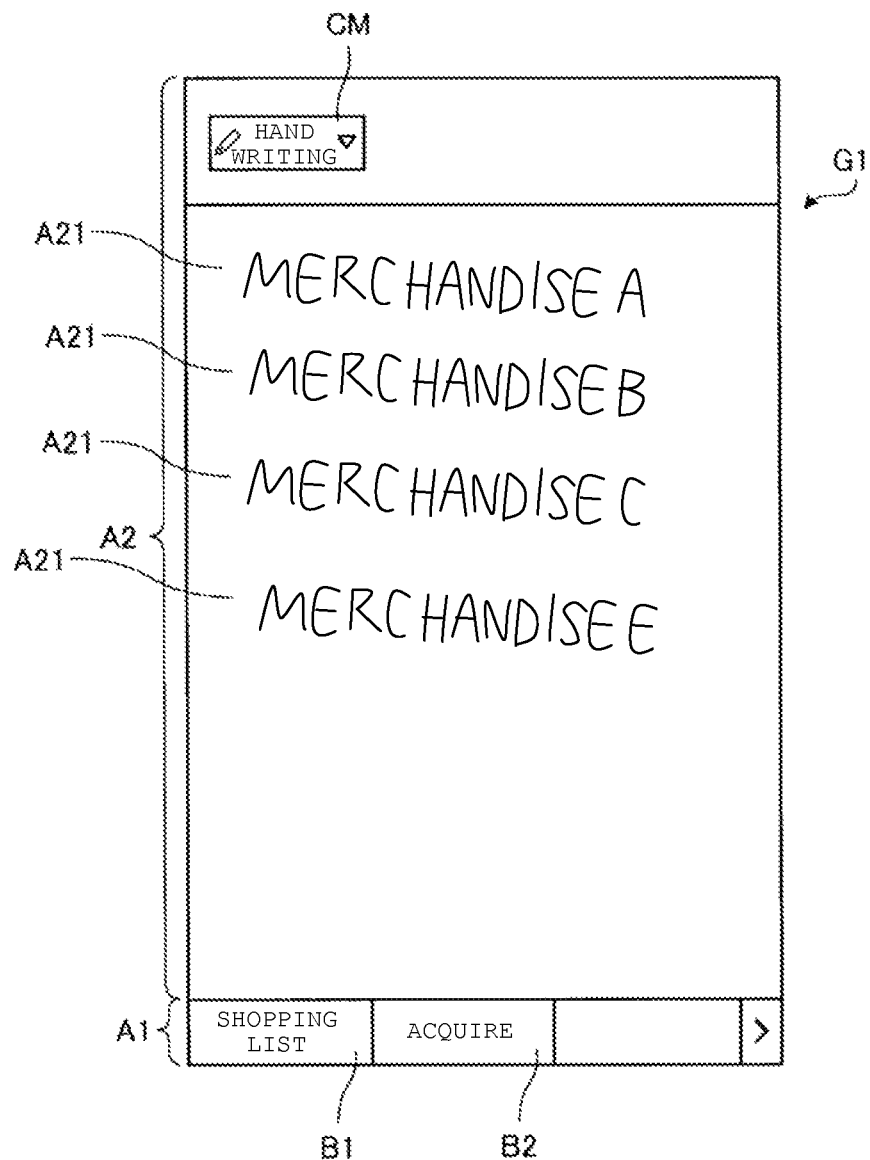

FIG. 14 shows the shopping list screen G1 in which the candidate items are input by handwriting. In FIG. 14, pieces of handwritten memo information A21 of "merchandise A", "merchandise B", "merchandise C", and "merchandise E" of which the inputs are received are displayed in the second area A2 as the candidate items.

Here, if the handwriting input mode is selected, the control module 21 uses a known handwritten character recognition technique to recognize one or more characters (merchandise name) indicating a candidate item from input (handwritten) data. For example, as shown in FIG. 14, if the handwritten characters are input on the shopping list screen G1, the control module 21 recognizes the character string of "merchandise A", "merchandise E" or the like as the merchandise name (general name) of the candidate item. Further, a merchandise specifying process is carried out based on the recognized characters. As a result of the merchandise specifying process, the characters of the specified merchandise are converted into memo information of print-type characters.

Alternatively, if the sound input mode is selected, the control module 21 uses a known sound recognition technique to recognize the sound (merchandise name) indicating a candidate item from input (sound) data. If the key input mode is selected, the control module 21 receives input characters (merchandise name) indicating the candidate item.

If the code input mode is selected, the control module 21 decodes a code symbol imaged by the imaging module 24 using a known reading technique. The control module 21 receives data (merchandise ID) obtained by the decoding that corresponds to a candidate item. If the merchandise name may be specified from the merchandise code, the merchandise name corresponding to the merchandise ID may be used for the candidate item.

If the image input mode is selected, the control module 21 uses a known object recognition technique to recognize a candidate item (merchandise name) from an image of the candidate item imaged by the imaging module 24.

Then, the control module 21 of the customer terminal 2 transmits information about the candidate item (merchandise name and merchandise ID) of which the input is received as the purchase schedule information, together with the customer ID of the operator, to the center server 3 (step S15). The transmission to the center server 3 may be performed whenever the candidate item is input, or may be performed so that information about plural candidate items are transmitted at a time according to a predetermined operation or the like.

On the other hand, the control module 31 of the center server 3 determines whether or not purchase schedule information including a customer ID and a candidate item is received from the customer terminal 2 (step S21). If it is determined that the purchase schedule information is received (Yes in step S21), the control module 31 stores the received purchase schedule information in the shopping list management table T1 (step S22). Further, the control module 31 adds the received candidate merchandise to the statistical processing unit 351 (step S23). Furthermore, the control module 31 transmits the received customer ID and the purchase schedule information to the store server 4 (step S24).

Here, the store server 4, which is a transmission destination, is not particularly limited, but it is preferable to select the store server 4 of a store that sells the candidate item. For example, the control module 31 may transmit the received customer ID and the purchase schedule information to all store servers 4 connected to the center server 3. Further, the store server 4, which is the transmission destination, may be selected based on the purchase history information stored in the first purchase history management table T2. In this case, the control module 31 extracts a record corresponding to the customer ID received from the customer terminal 2 from the first purchase history management table T2. Further, the control module 31 selects the store server 4 of the store (store ID) included in the extracted record as the transmission destination. Here, all the stores included in the extracted record or a store that satisfies a predetermined condition, for example, having the number of extractions of a predetermined value or greater may be set as the transmission destination. Further, a store having a purchase record of the candidate item included in the purchase schedule information, among the stores included in the extracted record, may be set as the transmission destination.

If the customer ID and the purchase schedule information are received from the center server 3 (Yes in step S31), the control module 41 of the store server 4 extracts the record of the item corresponding to the candidate item included in the purchase schedule information from the merchandise management table T3 (step S32).

Here, when the candidate item is expressed by a specific name, the control module 41 extracts the record of the item corresponding to the specific name from the merchandise management table T3. When the candidate item is expressed by a common name, the control module 41 extracts the record of the item that belongs to the category or the like corresponding to the general name, from the merchandise management table T3. When the candidate item is expressed by a merchandise ID, the control module 41 extracts the record of the item corresponding to the merchandise ID from the merchandise management table T3.

The control module 41 of the store server 4 issues an electronic coupon offering a benefit such as discount or reward point with respect to the item extracted by the control module 41, and adds the electronic coupon to the record of the corresponding item (step S33).

Here, the item subject to the electronic coupon is not particularly limited. For example, when a specific item subject to the electronic coupon is determined in advance among the items extracted by the control module 41, the electronic coupon is attached to the record of the determined item (step S33).

Further, an item to which the electronic coupon is offered may be dynamically determined according to the purchase history. In this case, for example, an item to which the electronic coupon is offered may be determined based on a purchase rate, a purchase record, or the like that are obtained based on the record of the customer ID received from the center server 3, from the purchase merchandise management table T4 or the second purchase history management table T5. The target of the coupon is not limited to a single item, and may be all items or a visit to the store. Further, an expiration date or the like may be set for the electronic coupon.

The control module 41 of the store server 4 transmits the record of each item extracted by the control module 41, the electronic coupon issued by the control module 41, and the store ID of the host store, each as additional information, together with the customer ID received by the control module 41, to the center server 3 (step S34).

The information included in the additional information is not limited to the above, and may include different information. For example, advertisement information for advertisement of the store, a specific item or the like may be included in the additional information. In this case, the advertisement information may be prepared in advance, or may be dynamically generated by the control module 41 or the like based on the item or the like extracted by the control module 41. Further, in this process, the store server 4 generates and transmits the additional information, but the embodiment is not limited thereto. For example, a salesperson or the like may manually operate to generate and transmit the additional information based on the purchase schedule information transmitted from the center server 3, for example. In this case, for example, the benefit such as discount may be issued to an item that is frequently on the purchase schedule, as an electronic coupon, to attract to the store.

The control module 31 of the center server 3 determines whether the customer ID and the additional information are received from the store server 4 (step S41). If it is determined that the customer ID and the additional information are not received (No in step S41), the control module 31 waits for the reception, and if it is determined that the customer ID and the additional information are received (Yes in step S41), the control module 31 stores the additional information in a region of the shopping list management table T1 corresponding to the customer ID (step S42).

The control module 31 of the center server 3 reads comment information associated with the item included in the additional information, with reference to a region of the first purchase history management table T2 corresponding to the customer ID that is received from the store server 4. Subsequently, the control module 31 of the center server 3 adds the read comment information to the record of the item included in and corresponding to the additional information (step S43).

Further, the control module 31 adds the statistical information stored in the statistical processing unit 351 to the candidate information stored in step S22 (step S44).

Then, the control module 31 of the center server 3 transmits the additional information in which the comment information and the statistical information are included to the customer terminal 2 of the customer ID that is received from the store server 4 (step S45).

On the other hand, the control module 21 of the customer terminal 2 determines whether or not the additional information is received from the center server 3 (step S51). If it is determined that the additional information is received (Yes in step S51), the control module 21 stores the memo information, which is the candidate item information, including the comment information and the statistical information in the memo storage unit 282 (step S52). Further, the control module 21 executes a process of updating the display of the shopping list screen G1 using the received additional information (step S53).

Figure 15:
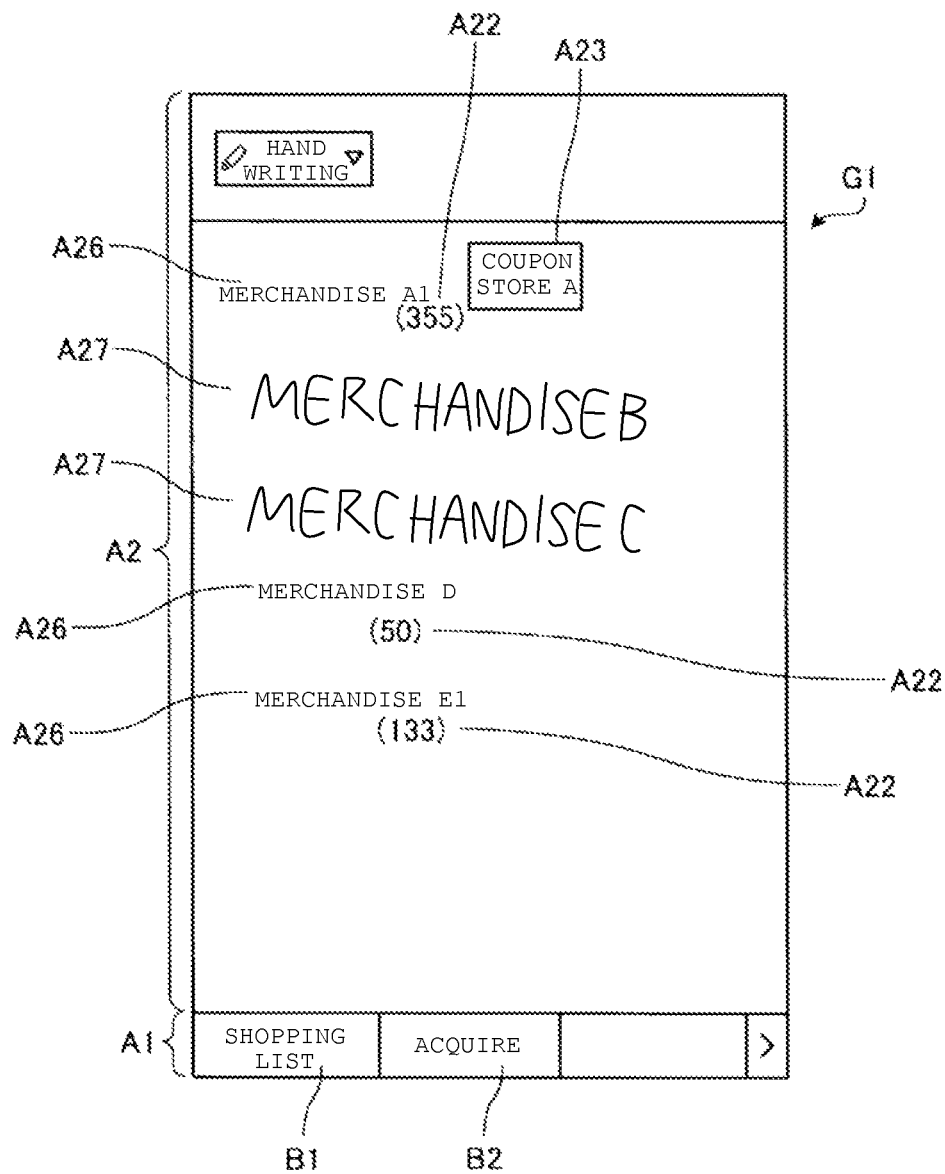

The updated shopping list screen G1 is shown in FIG. 15. In FIG. 15, memos A26 of "merchandise A1", "merchandise D", and "merchandise E1" are displayed in printing types since merchandises are specified. Further, memos A27 of "merchandise B" and "merchandise C" are displayed by handwritten characters since corresponding items are not specified. Further, pieces of statistical information A22 represent the sum of the number of corresponding items sold during a predetermined period (for example, one month) and the number of the corresponding items input to the customer terminal 2 for the predetermined period as candidate items. The number of sold item and the number of input items may be separately displayed. Further, a displayed coupon A23 represents that a coupon is attached to the corresponding item.

In the example of FIG. 15, the coupon A23 is attached to "merchandise A1". Further, the pieces of statistical information A22 (numerals indicating that inputs of "355," "50," and "133" have been performed with respect to memos of "merchandise A1", "merchandise D", and "merchandise E1," respectively) are displayed in the vicinity of the memos A26 of print types. These numerical values are numerical values that represent the degree of reputation, expectation, or evaluation to the corresponding item from customers.

Figure 12:
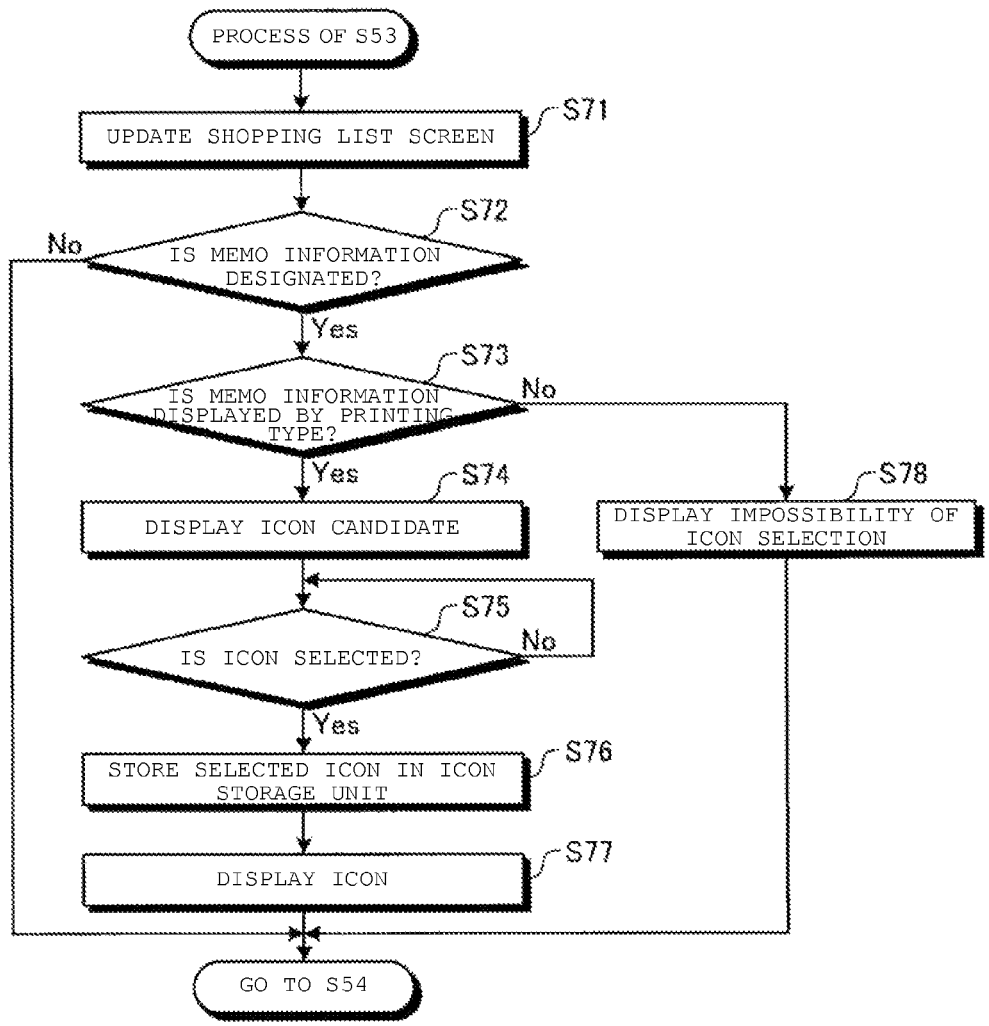
FIG. 12 is a flowchart of an icon addition process carried out by the customer terminal.

In step S53, an icon addition process is executed. FIG. 12 is a flowchart of the icon addition process carried out in step S53 in detail. In FIG. 12, the control module 21 updates the display of the shopping list screen G1 (step S71). Then, the control module 21 determines whether or not memo information of any candidate item displayed in the shopping list screen G1 is designated by a customer's touch operation (step S72).

A customer who carries the customer terminal 2 may operate to attach an icon indicating reputation or expectation for the item of the corresponding memo information, with respect to the memo information A26 displayed by print types, on the shopping list screen G1 displayed on the display module 23. In this case, the customer touches and designates memo information of an item to which the icon is to be attached on the shopping list screen G1. If it is determined that the memo information is designated (Yes in step S72), the control module 21 reverses the display of the merchandise name to indicate that the memo information is designated.

Then, the control module 21 determines whether the designated memo information is the memo information A26 displayed by print types or the memo information A27 displayed by handwriting (step S73). If it is determined that the designated memo information is the memo information displayed by print types (Yes in step S73), the control module 21 pop-up displays candidate icons indicating reputation or expectation in the vicinity of the corresponding memo information (step S74).

The customer selects and touches (designates) one of the displayed icons. The control module 21 determines whether or not one of the icons is designated (step S75). If it is determined that one of the icons is not designated (No in step S75), the control module 21 waits for the designation. If it is determined that one of the icons is designated (Yes in step S75), the control module 21 stores the designated icon in correlation with the corresponding memo information in the icon storage unit 281 (step S76). Further, the control module 21 displays in association with the designated icon on the rear side of the display of the corresponding memo information (step S77).

Here, the displayed icon represents the expectation degree or reputation for an item that may be purchased in the future, which the customer determined to attach to the item. In the exemplary embodiment, with respect to the item of the handwritten memo information A27, since a single item is not determined, the icon indicating the expectation degree or reputation for the item cannot be attached. However, the icon indicating the expectation degree or reputation for the item may be attached to even the item of the handwritten memo information A27.

Further, in the embodiment, the same icon may be attached to one piece of memo information only once. Because the same icon cannot be attached to the memo-written item several times, more accurate statistical data such as reputation for the merchandise can be obtained. However, the icon may be attached to the same memo information several times.

Figure 16:
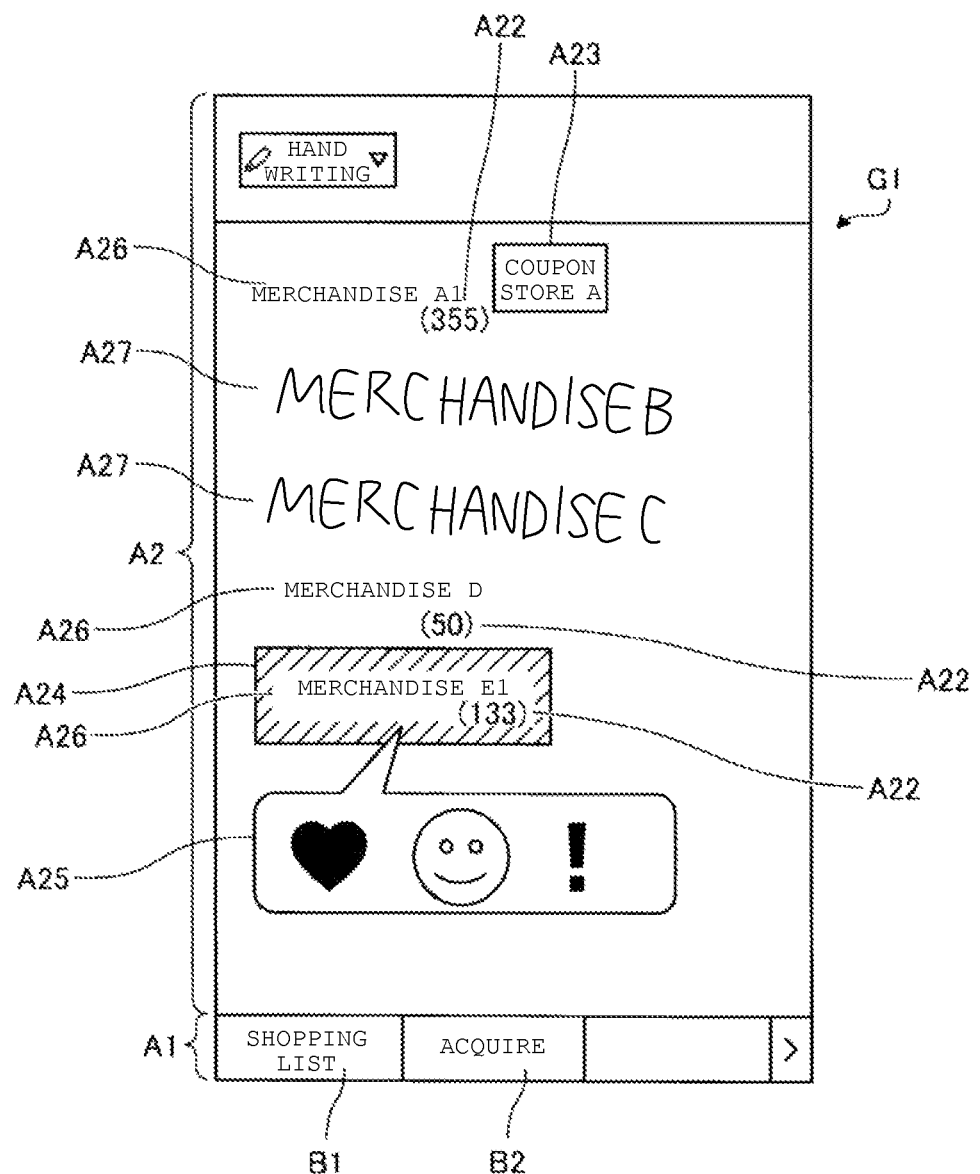

FIG. 16 shows an example of the shopping list screen G1 where the memo information can be touch-operated. In FIG. 16, "merchandise E1," is displayed as a reversed display A24 when it is touched and selected by the customer. Further, in the vicinity of the memo information A26 of the "merchandise E1", three icons A25 are popped up. The customer touches one of the icons desired by the customer. Then, the touched and designated icon is displayed in association with the memo information A26 of the "merchandise E1" on the rear side of the memo information A26 of the "merchandise E1".

Figure 17:
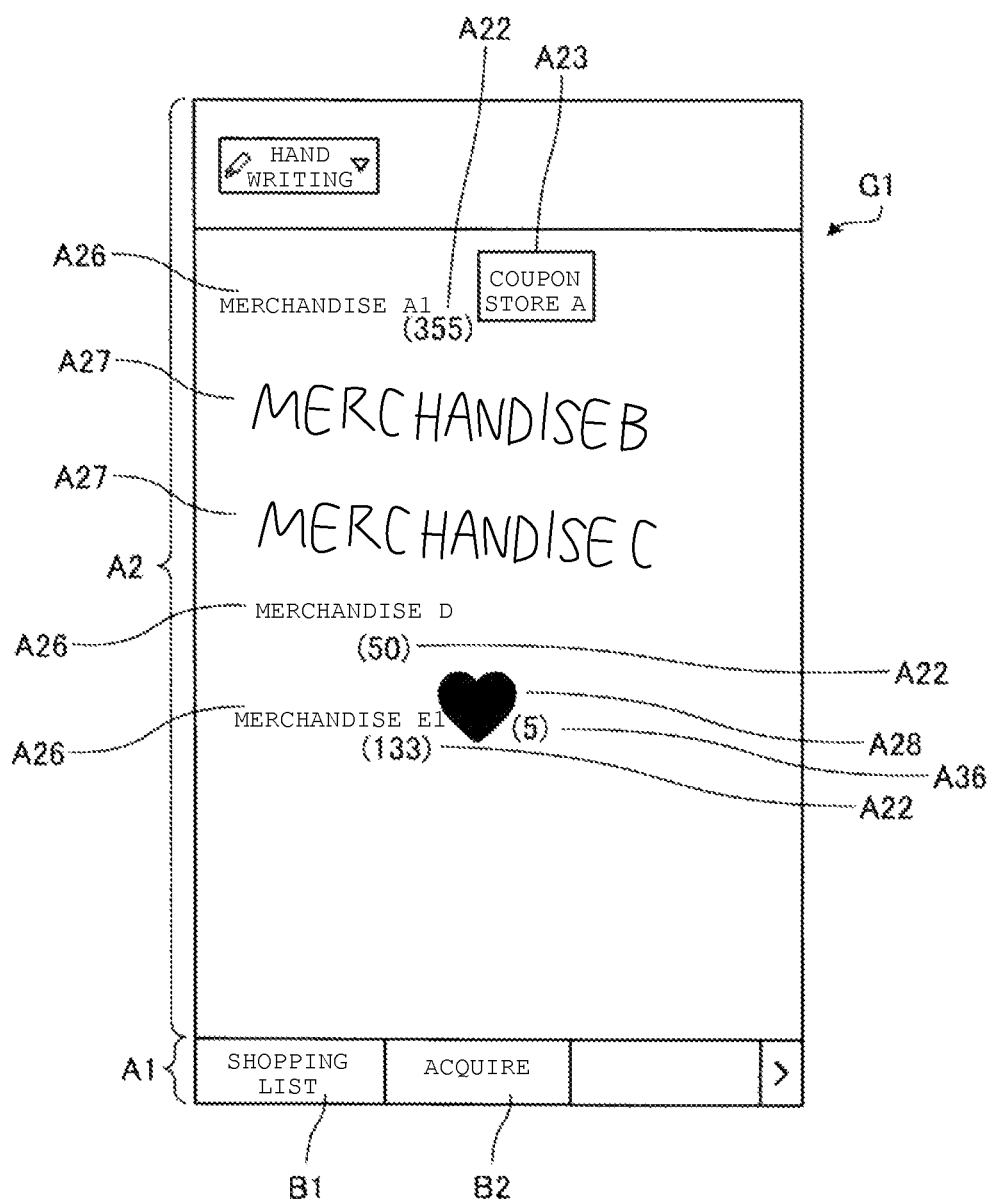

FIG. 17 illustrates an example of the shopping list screen G1 having the icon displayed in step S75. In the example of FIG. 17, a heart icon (icon indicating the expectation for the item) is selected, and then, a heart icon A28 is displayed on the right of the "merchandise E1" in association. In the vicinity of the icon, statistical information A36 indicating the number of times the icon has been attached previously (in the exemplary embodiment, the heart icon) with respect to the corresponding item (in the exemplary embodiment, the "merchandise E1") is displayed. The statistical information A36 is a numerical value indicating the degree of reputation or expectation of the item. In the embodiment, the number is five. When a different icon is also attached to the same item, the respective icons are displayed, and the number of times each icon has been attached is displayed in association with the respective icons.

Returning to FIG. 11B, the control module 21 transmits the display screen information displayed in step S53 together with the customer ID of the customer terminal 2 to the center server 3 (step S54).

The control module 31 of the center server 3 determines whether or not the customer ID and the display screen information are received from the customer terminal 2 (step S61). If it is determined that the customer ID and the display screen information are not received (No in step S61), the control module 31 waits for the reception. If it is determined that the customer ID and the display screen information are received (Yes in step S61), the control module 31 stores the display screen information in a region of the shopping list management table T1 corresponding to the customer ID (step S62). Further, the control module 31 adds +1 to the number of times the icon has been attached, which is stored in the statistical processing unit 351 in association with the merchandise information, based on the simultaneously received icon information. That is, the statistical processing unit 351 stores the number of times to the merchandise information in association with the item with respect to each icon. The number of pieces of memo information, the number of purchases, and the number of times the icon has been attached stored in the statistical processing unit 351 are statistically calculated to create merchandise ranking.

Thereafter, in the customer terminal 2 and the center server 3, the control module 21 and the control module 31 cooperate with each other to perform synchronization of the purchase schedule information, the additional information, and the display screen information. For example, when any one of the purchase schedule information, the additional information, and the display screen information is updated in any one device of the customer terminal 2 and the center server 3, the updated content is reflected in the other device thereof.

Further, if the customer ID is received from the customer terminal 2 when the customer terminal 2 starts, the control module 31 of the center server 3 reads the purchase schedule information, the additional information, and the display screen information corresponding to the customer ID from the shopping list management table T1, and provides the result to the customer terminal 2. The control module 21 of the customer terminal 2 compares each piece of information (purchase schedule information, additional information, and display screen information) provided from the center server 3 with each piece of information locally stored, to update the information as the latest date and time.

According to this operation, the customer may input the same customer ID to thereby display the shopping list created by the customer on any customer terminal 2. Accordingly, for example, the shopping list may be created at a large customer terminal 2 such as a tablet and displayed at a portable small customer terminal 2, for convenience of the customer.

Then, the control module 31 determines whether or not the received display screen information may be disclosed (step S63). When a customer registers to the service of the shopping support system 1, or each time the display screen information is transmitted to the center server 3 from the customer terminal 2 in step S54, the customer transmits information indicating whether or not the display screen information may be disclosed to another person. The control module 31 determines whether to disclose the display screen information with reference to the information received from the customer. If it is determined that the display screen information will be disclosed (Yes in step S63), the control module 31 stores the display screen information in the disclosure unit 352 (step S64). Then, the control module 31 terminates the process. If it is determined that the display screen information will not be disclosed (No in step S63), the control module 31 terminates the process without storing the display screen information in the disclosure unit 352.

When the control module 21 of the customer terminal 2 determines in step S11 that the shopping list button B1 is not operated (No in Step S11), the control module 21 determines whether or not the capture button B2 is operated (step S16). If it is determined that the capture button B2 is operated (Yes in step S16), the control module 21 executes an information capturing process to be described later in FIG. 24 (step S17). Then, the control module 21 terminates the process. On the other hand, if it is determined that the capture button B2 is not operated (No in step S16), the control module 21 returns to step S11.

According to such an exemplary embodiment, the icon indicating the reputation or expectation of the customer may be attached at the customer terminal 2 based on the memo information displayed on the customer terminal 2. Thus, the customer may check an item to be purchased. Further, the attached icon may be displayed on the customer terminal 2 in association with the memo information. In addition, the input memo information or the attached icon may be transmitted to the center server 3 to be collected as the statistical information. Further, the statistical information indicating the number of pieces of previous memo information or the statistical information indicating the number of times the icon has been attached may be displayed on the customer terminal 2 based on the statistical information stored in the center server 3 in association with the item.

Figure 18:
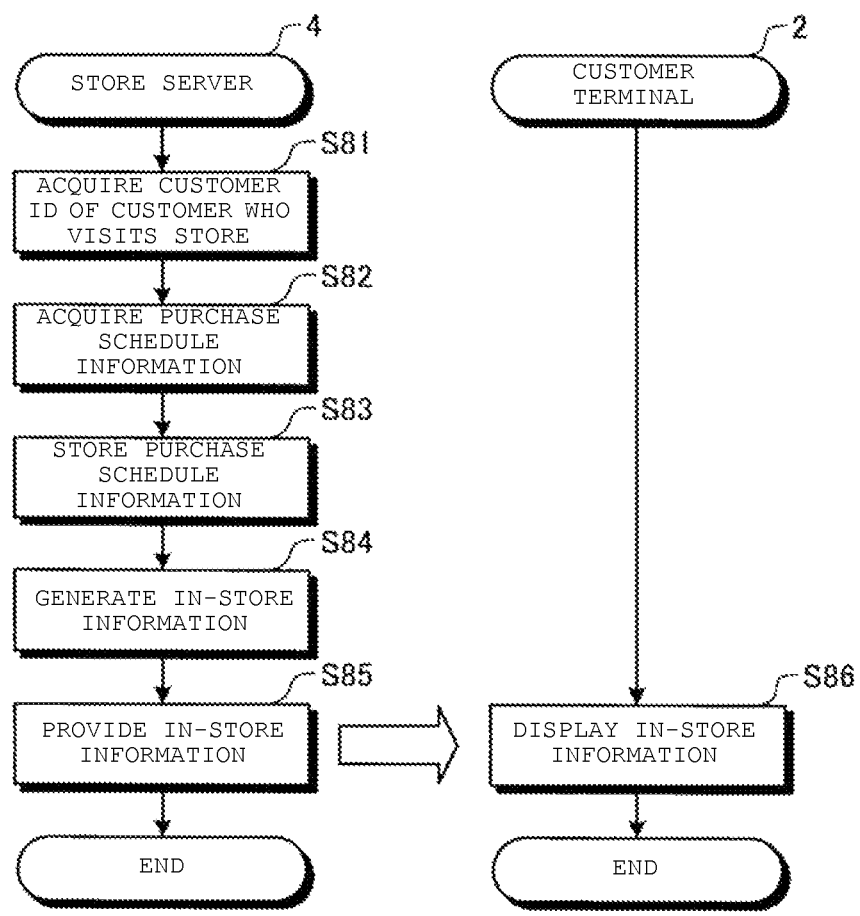
FIG. 18 is a flowchart of a shopping support process carried out by the store server and the customer terminal.

Next, a shopping support process performed in the store will be described. FIG. 18 is a flowchart of the shopping support process. In this process, it is assumed that a customer who visits the store carries the customer terminal 2 having a customer ID of the customer.

First, the control module 41 of the store server 4 acquires the customer ID from the customer terminal 2 of the customer who visits the store through a communication device (not shown) in the store connected to the store server 4 (step S81). Here, the type or installation position of the communication device is not particularly limited. For example, the customer ID may be acquired from the customer terminal 2 through a short range communication device such as NFC provided in an entrance of the store, an entrance of a parking lot, or the like. Alternatively, the customer ID may be acquired from the customer terminal 2 through an access point that provides a public wireless LAN service or the like in the store.

The control module 41 of the store server 4 acquires purchase schedule information relating to the customer ID acquired by the control module 41 (step S82). Here, a destination of the purchase schedule information may be the customer terminal 2, or may be the center server 3. For example, when the purchase schedule information is acquired from the customer terminal 2, the purchase schedule information may be acquired from the customer terminal 2 through the same communication device as that of the control module 41. Further, when the purchase schedule information is acquired from the center server 3, the purchase schedule information corresponding to the customer ID acquired by the control module 41 is acquired from the shopping list management table T1 of the center server 3.

Then, the control module 41 of the store server 4 stores the acquired purchase schedule information in the purchase merchandise management table T4, in correlation with the customer ID acquired by the control module 41 and the current date and time (visit date and time) (step S83).

The control module 41 of the store server 4 generates in-store information including advertisement information for advertisement of a specific item, shopping support information for shopping support, or the like (step S84). Further, the control module 41 provides the generated in-store information to the customer terminal 2 associated with the customer ID acquired by the control module 41 (step S85). Specifically, the in-store information is provided (transmitted) to the customer terminal 2 through the communication device in the store connected to the store server 4.

Here, the advertisement information or the shopping support information provided to the customer terminal 2 may be generated based on a purchase schedule acquired by the control module 41. For example, advertisement information for advertisement of each candidate item included in the purchase schedule may be generated. Further, shopping support information indicating which location in the store each candidate item included in the purchase schedule is located. When the shopping support information is generated, the control module 41 specifies a location of each candidate item included in the purchase schedule based on map information in which the location of each item for sale in the store is recorded. Further, the control module 41 generates the map information in which the location of the candidate item is recorded as the shopping support information.

The information included in the in-store information is not limited to the above. For example, when a benefit such as reward points is provided only to customers who come to the store, an electronic coupon indicating the benefit may be included in the in-store information for transmission.

When the in-store information is received from the store server 4, the control module 21 of the customer terminal 2 displays the in-store information on the display module 23 according to an operation of an operator or the like (step S86). For example, when the electronic coupon offering reward points to customers who visit the store is included in the shopping support information, the control module 21 of the customer terminal 2 displays a benefit provision screen in accordance with the electronic coupon. When the shopping support information (map information) is included in the in-store information, the control module 21 of the customer terminal 2 displays the shopping support screen indicating the location of the candidate item in the store according to a predetermined operation.

Figure 19:
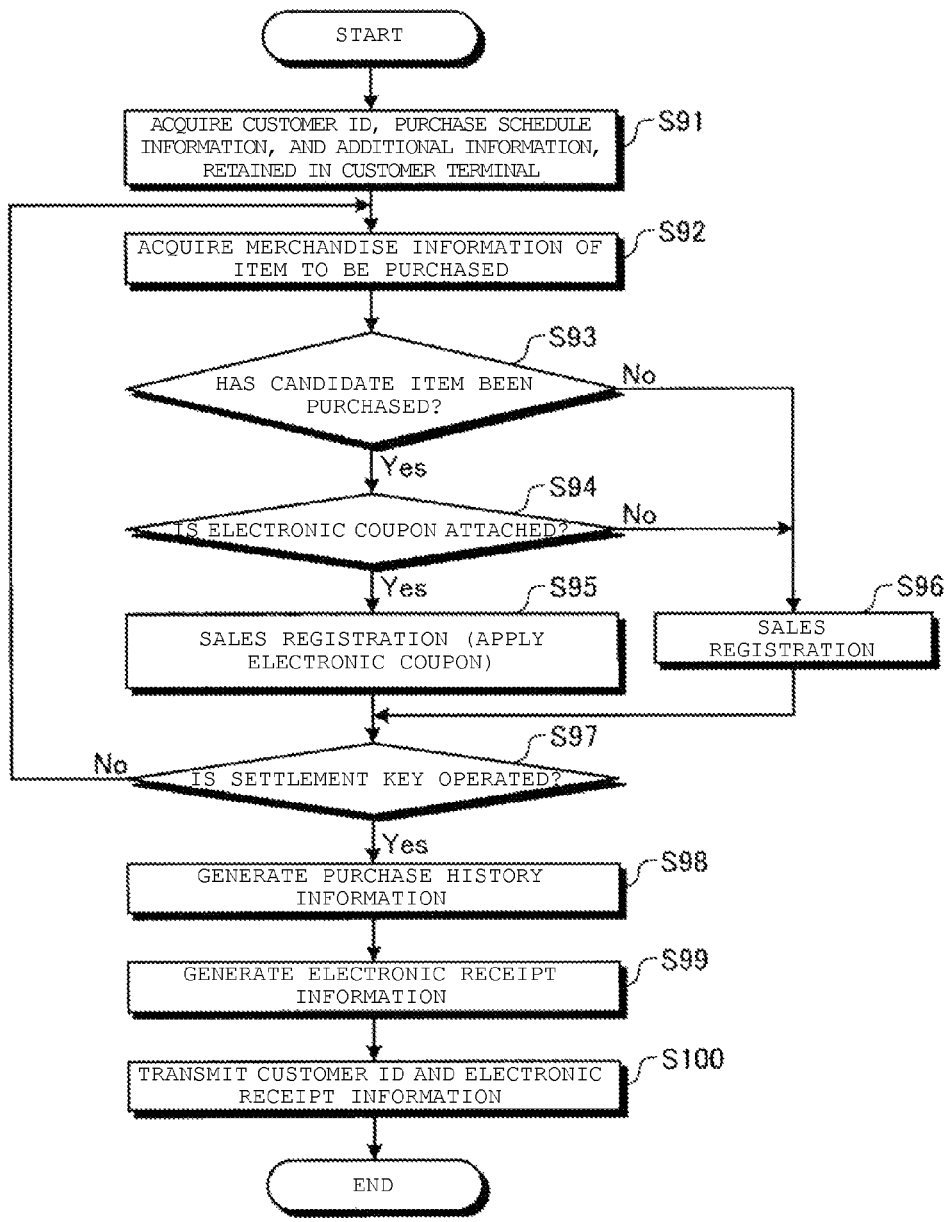
FIG. 19 is a flowchart of a process carried out by a POS terminal.

Next, merchandise sales data processing performed by the POS terminal 5 when a customer purchases an item will be described. FIG. 19 is a flowchart of the merchandise sales data processing.

First, the control module 51 of the POS terminal 5 acquires the customer ID, the purchase schedule information, and the additional information retained in the customer terminal 2 (step S91). Here, a method for acquiring the customer ID, the purchase schedule information, and the additional information is not particularly limited. For example, the customer ID, the purchase schedule information, and the additional information may be directly acquired from the customer terminal 2 through the short range communication I/F 57. Further, by using the customer ID acquired from the customer terminal 2 as a search key, the purchase schedule information or the additional information may be acquired from the purchase merchandise management table T4.

The control module 51 of the POS terminal 5 acquires, based on a merchandise ID of an item to be purchased, which is obtained through the code scanner 55, merchandise information (merchandise name, unit price, or the like) corresponding to the merchandise ID from the merchandise management table T3 (step S92).

The control module 51 of the POS terminal 5 performs matching of the merchandise name of the purchased item acquired by the control module 51 and each of the candidate items included in the shopping list, thereby determining whether or not the candidate item is purchased (step S93). When an item other than the candidate item is purchased (No in step S93), the control module 51 performs sales registration of the purchase merchandise based on the merchandise information acquired by the control module 51 (step S96).

Further, if it is determined that the candidate item is purchased (Yes in step S93), the control module 51 of the POS terminal 5 determines whether or not the electronic coupon provided from the host store is attached to the candidate item as the additional information (step S94). Here, if it is determined that the electronic coupon is attached (Yes in step S94), the control module 51 of the POS terminal 5 performs the sales registration of the item to be purchased at a unit price reflecting the benefit of the electronic coupon (step S95). If it is determined that the electronic coupon is not attached (No in step S94), the control module 51 performs the sales registration of the item to be purchased at a normal unit price included in the merchandise information (step S96).

The control module 51 of the POS terminal 5 repeatedly executes steps S92 through S96 until the settlement key is operated by the operator (No in step S97). If the settlement key is operated (Yes in step S97), the control module 51 of the POS terminal 5 generates purchase history information indicating the detail of the transaction (step S98). Here, it is assumed that the purchase history information includes the merchandise name, merchandise ID, unit price, and the like of each purchased items.

Further, the control module 51 of the POS terminal 5 generates electronic receipt information to be displayed on the customer terminal 2 based on the generated purchase history information (step S99). In addition, the control module 51 transmits the electronic receipt information to the center server 3 (step S100). When the electronic receipt information is transmitted to the center server 3, corresponding customer ID is also transmitted.

According to the merchandise sales data processing as described above, the electronic coupon provided from the store when the shopping list is created may be applied when the customer purchases the candidate item. Thus, the customer who purchases the candidate item may automatically use the benefit notified when the shopping list was created, and thus, it is possible to prevent user from forgetting to use the electronic coupon, and to improve user convenience.

Figure 20:
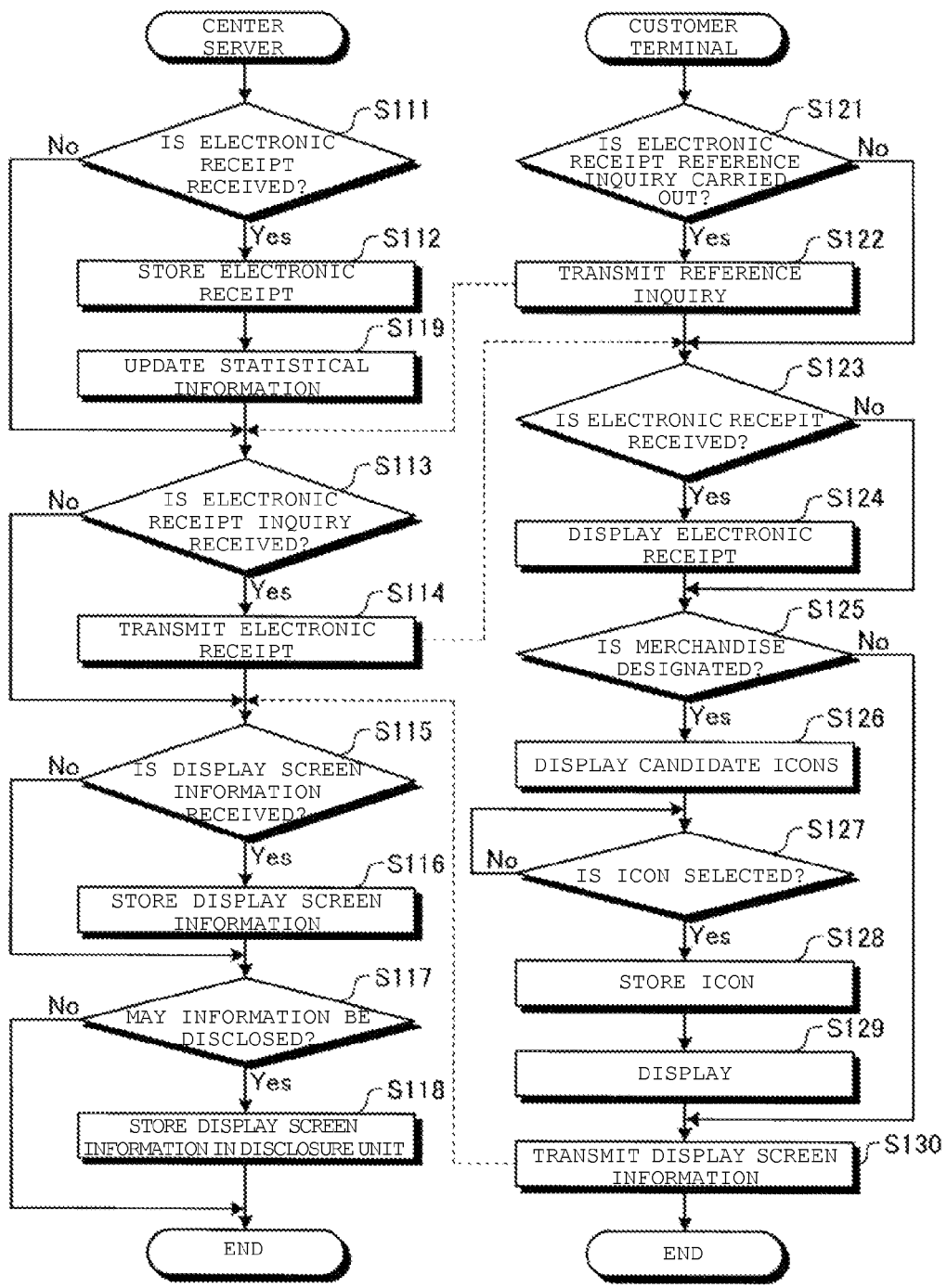
FIG. 20 is a flowchart of an electronic receipt process carried out by the center server and the customer terminal.

Next, various control processes relating to the electronic receipt information that are achieved as the respective CPUs of the control module 21 of the customer terminal 2 and the control module 31 of the center server 3 execute various programs will be described with reference to FIGS. 20 to 22. When receiving the electronic receipt information transmitted by the control module 51 of the POS terminal 5, the customer terminal 2 and the center server 3 execute the operation shown in FIG. 20. That is, the control module 31 of the center server 3 determines whether or not the electronic receipt information is received from the POS terminal 5 (step S111). If it is determined that the electronic receipt information is received (Yes in step S111), the control module 31 stores the received electronic receipt information in the electronic receipt unit 353 (step S112). Then, the control module 31 adds the number based on the merchandise information received as the current electronic receipt information to the statistical number of a corresponding item stored in the statistical processing unit 351, based on the stored electronic receipt information, to update the statistical information (step S119).

Then, the control module 31 determines whether a reference inquiry of the electronic receipt is received from the customer terminal 2 (step S113). If it is determined that the reference inquiry is received (Yes in step S113), the control module 31 transmits the latest electronic receipt information corresponding to the customer ID to the customer terminal 2 based on the customer ID included in the received inquiry (step S114).

On the other hand, the control module 21 of the customer terminal 2 determines whether or not a reference inquiry of the electronic receipt based on an operation of the customer is carried out (step S121), and if it is determined that the reference inquiry of the electronic receipt is carried out (Yes in step S121), the control module 21 transmits inquiry information to the center server 3 (step S122). Then, the control module 21 determines whether or not the electronic receipt information transmitted in step S114 is received from the center server 3 (step S123). If it is determined that the electronic receipt information is received (Yes in step S123), the control module 21 displays the received electronic receipt information on the display module 23 (step S124).

In this state, if the customer touches and designates one piece of merchandise information in the electronic receipt displayed on the customer terminal 2, the merchandise information is reversely displayed. The control module 21 determines whether or not the item is designated by the customer (step S125). If it is determined that the item is designated (Yes in step S125), the control module 21 operates so that candidates of icons indicating evaluation or the like obtained through the purchase of the item are popped up in the vicinity of the merchandise information (step S126).

FIG. 21 shows an example of the electronic receipt displayed in step S124, merchandise information A24 that is reversely displayed based on the touch operation of the customer, and icon pop-up display A30. In FIG. 21, "merchandise E1" has been touch-operated and reversely displayed. Further, three icons are displayed at the same time.

The customer touch-operates one of the popped up icons. The control module 21 determines whether or not one of the icons is selected by the customer (step S127). If it is determined that one of the icons is not designated (No in step S127), the control module 21 waits for the selection. If it is determined that one of the icons is selected (Yes in step S127), the control module 21 stores, in the icon storage unit 281, the selected icon and the merchandise information in association (step S128). Further, the control module 21 displays the stored icon on the display module 23 in association with the merchandise information (step S129). Then, the control module 21 transmits the displayed display screen information to the center server 3 (step S130). Then, the control module 21 terminates the process.

FIG. 22 illustrates a screen of the electronic receipt displayed in step S129. In FIG. 22, with respect to the merchandise display of the merchandise E1, an icon A31 indicating evaluation of the merchandise is displayed on the right bottom of the merchandise display. In the example of FIG. 22, an icon indicating high evaluation of the item is attached based on customers' tasting of the item.

Further, a numeral A36 indicating the number of times the icon has been attached to the item is displayed in association with the icon in the vicinity of the icon. In FIG. 22, a numeral "5" indicating that the heart icon has been previously attached five times is displayed.

In the embodiment, the same icon may be attached only once to one piece of merchandise information displayed in the electronic receipt. Because the same icon cannot be attached to one piece of merchandise information several times, more accurate statistical data of evaluation or the like for the item can be obtained. However, the icon may be attached to the same merchandise information more than once.

On the other hand, the control module 31 of the center server 3 determines whether or not the display screen information transmitted in step S130 is received (step S115). If it is determined that the display screen information transmitted is received (Yes in step S115), the control module 31 stores the received display screen information in the shopping list management table T1 (step S116). Here, the control module 31 adds +1 to the number of times the icon has been attached, which is stored in the statistical processing unit 351 in association with the merchandise information, based on the icon information received in step S115. Merchandise ranking is created based on the number of comments about the item stored in the statistical processing unit 351 and the stored number.

Then, the control module 31 determines whether or not the display screen information stored in the shopping list management table T1 may be disclosed (step S117). The determination is made based on the disclosure suitability information from the customer, in a similar was as step S63. If it is determined that the display screen information may be disclosed (Yes in step S117), the control module 31 stores the display screen information in the disclosure unit 352 (step S118). Then, the control module 31 terminates the process.

If it is determined in step S111 that the electronic receipt information is not received from the POS terminal 5 (No in step S111), the control module 31 executes a process of step S113 without executing the process of step S112. If it is determined in step S113 that the inquiry information of the electronic receipt is not received from the customer terminal 2 (No in step S113), the control module 31 executes step S115 without executing step S114. Further, if it is determined in step S115 that the display screen information is not received from the customer terminal 2 (No in step S115), the control module 31 executes step S117 without executing step S116. Further, if it is determined in step S117 that the display screen information may not be disclosed (No in step S117), the control module 31 terminates the process without executing step S118.

Further, if it is determined in step S121 that the inquiry of the electronic receipt from the customer is not carried out (No in step S121), the control module 21 executes step S123 without executing step S122. Further, if it is determined in step S123 that the electronic receipt information is not received (No in step S123), the control module 21 executes step S125 without executing step S124. Further, if it is determined in step S125 that the merchandise designation is not operated by the customer (No in step S125), the control module 21 executes step S130 without executing steps S126 through S129.

According to the embodiment, the customer may view the received electronic receipt and attach evaluation information of the customer with respect to the purchased item as an icon. Further, the customer may operate the customer terminal 2 to display the attached icon as a part of the electronic receipt in association with the merchandise information. Further, the customer may allow the attached icon to be collected by the center server 3 as the statistical information. Furthermore, the customer may operate the customer terminal 2 to display the statistical information of the attached icons in association with the merchandise information displayed in the electronic receipt based on the statistical information stored in the center server 3.

Figure 23:
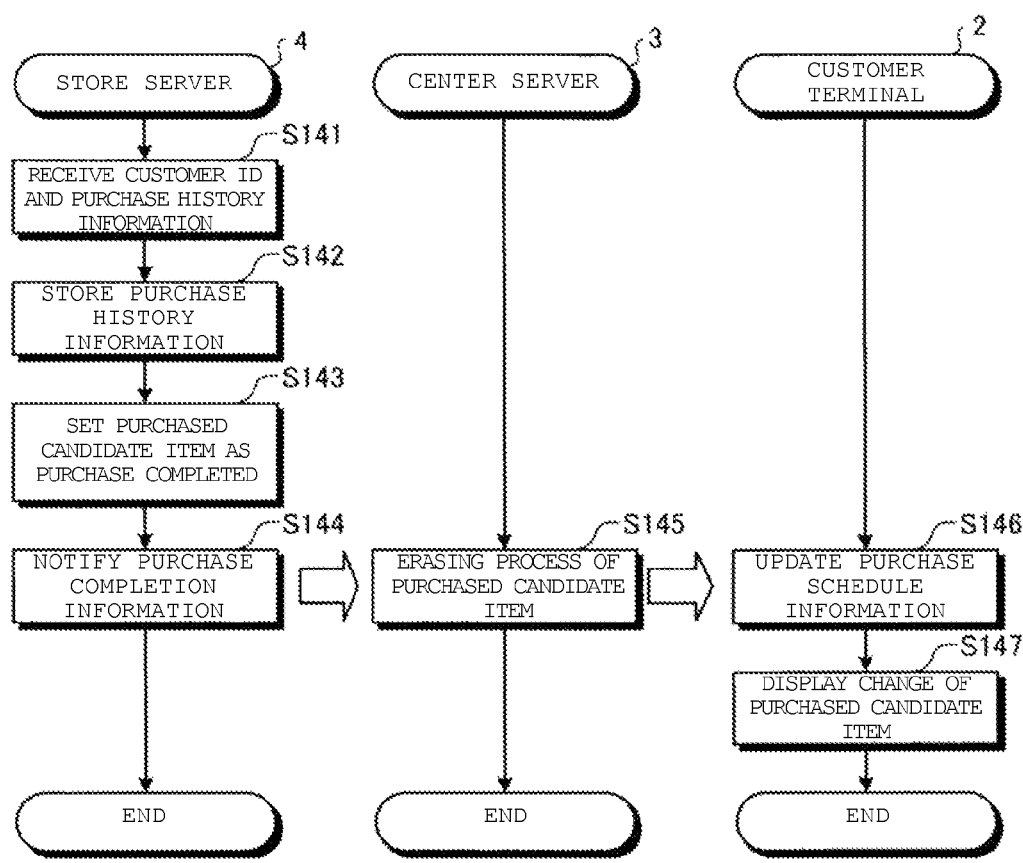
FIG. 23 is a flowchart of a candidate merchandise erasing process.

Next, an erasing process of a candidate item performed after purchase of the candidate item will be described. FIG. 23 is a flowchart of a candidate item erasing process.

First, when the control module 41 of the store server 4 receives the customer ID and the purchase history information from each POS terminal 5 in the store (step S141), the control module 41 stores a set of the customer ID and the purchase history information in the first purchase history management table T2 of the center server 3, and the second purchase history management table T5 of its own apparatus (step S142). When the control module 41 stores the set of information in the first purchase history management table T2 of the center server 3, the control module 41 also stores the store ID of the host store.

Then, the control module 41 of the store server 4 sets a candidate item that has been purchased as "purchase completed" (step S143). Specifically, with respect to the same customer ID, the control module 41 compares the purchased item included in the purchase history information with the candidate item included in the purchase schedule information of the purchase merchandise management table T4. The control module 41 sets purchase completion information of the purchased merchandise management table T4 as "purchase completed," with respect to the candidate item that matches the merchandise name of the purchased item (specific name, general name).

Further, the control module 41 of the store server 4 notifies the center server 3 of the candidate item set as the purchase completed as the purchase completion information, together with corresponding customer ID (step S144).

When the control module 31 of the center server 3 receives the customer ID and the purchase completion information from the store server 4, the control module 31 executes the erasing process of the purchased candidate item from the purchase schedule information of the shopping list management table T1 corresponding to the customer ID (step S145). Here, the erasing process may be a process of removing the candidate item from the purchase schedule information, or may be a process of attaching a flag or the like indicating that the purchase is finished to the candidate item.

On the other hand, if the erasing process is performed for the purchase schedule information corresponding to the customer ID of the own apparatus at the center server 3, the control module 21 of the customer terminal 2 updates the local purchase schedule information for the customer terminal 2 (step S146). That is, the control module 21 of the customer terminal 2 also removes the memo of the item stored in the memo storage unit 282 of the customer terminal 2. Further, the control module 21 of the customer terminal 2 changes the display of the purchased candidate item based on the purchase schedule information subjected to the erasing process (step S147).

For example, when the purchased candidate item is removed from the purchase schedule information through the erasing process in the center server 3, the control module 21 of the customer terminal 2 causes the candidate item to be not displayed. Further, when the flag indicating that the purchase has been completed is attached to the purchased candidate item through the erasing process at the center server 3, the control module 21 operates to display a deletion mark or the like near the candidate item, so that it can be obviously recognized that the purchase has been completed.

According to the candidate item erasing process as described above, when the candidate item has been purchased, the candidate item may be removed from the shopping list, or the notification indicating that the purchase has been completed may be displayed on the shopping list. As the shopping list reflects the current state of the candidate item, the user can more easily recognize the candidate item that has not been purchased.

During the candidate item erasing process, the purchase schedule information retained by the center server 3 is updated, but the purchase schedule information retained by the customer terminal 2 may be directly updated. In this case, for example, by performing the erasing process for the purchase schedule information retained by the customer terminal 2 in the above-described merchandise sales data processing of the POS terminal 5, the updating of the purchase schedule information may be carried out.

Next, the information capture control process (process of step S17) carried out when the respective CPUs of the control module 21 of the customer terminal 2 and the control module 31 of the center server 3 execute various programs, in response to the capture button B2 (see FIG. 13 or the like) being operated, will be described in detail with reference to FIGS. 24 to 27.

Figure 24:
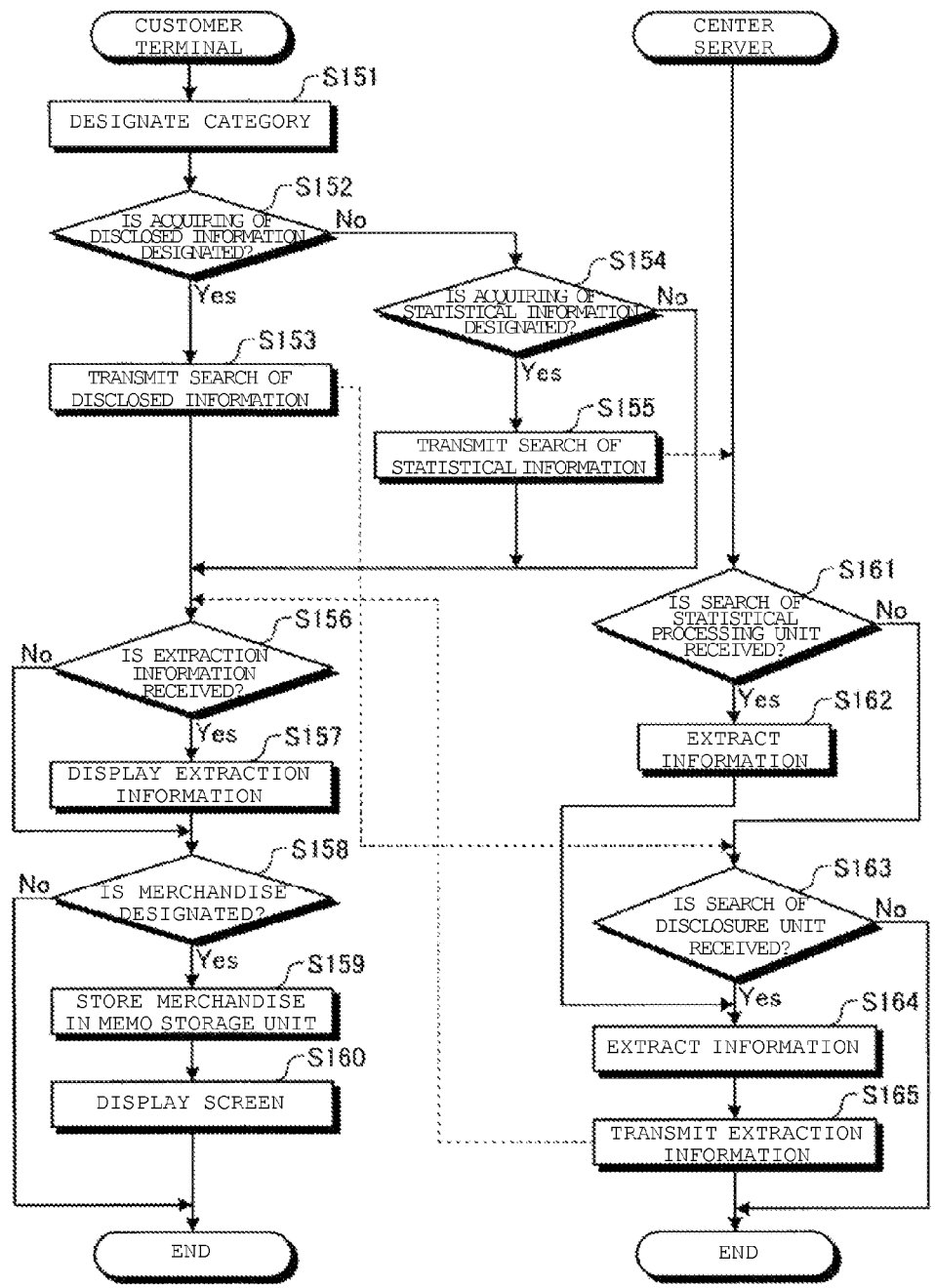
FIG. 24 is a flowchart of an information capturing process carried out by the center server and the customer terminal.

In FIG. 24, after the capture button B2 of the customer terminal 2 is operated, although not shown, a category of information to be acquired is input according to an instruction displayed on the display module 23. Then, the control module 21 designates the category of the information to be acquired based on the input information (step S151). Further, the customer designates whether to acquire disclosed memo information or ranking information as statistical information. The control module 21 determines whether or not acquiring of the disclosed information is designated by the customer (step S152). If it is determined that acquiring of the disclosed information is designated (Yes in step S152), the control module 21 transmits search information for instructing search of the disclosed information to the center server 3 (step S153).

On the other hand, if it is determined that acquiring of the disclosed information is not designated (No in step S152), the control module 21 determines whether or not acquiring of the statistical information is designated (step S154). If it is determined that acquiring of the statistical information is designated (Yes in step S154), the control module 21 transmits search information for instructing search of the statistical information to the center server 3 (step S155).

On the other hand, the control module 31 of the center server 3 determines whether or not the instruction of the search of the statistical information is received from the customer terminal 2 (step S161). If it is determined that the instruction of the search of the statistical information is received from the customer terminal 2 (Yes in step S161), the control module 31 searches the statistical processing unit 351 to extract information based on the instruction received in step S161 (step S162).

Further, if it is determined that the instruction of the search of the statistical information is not received from the customer terminal 2 (No in step S161), the control module 31 determines whether or not the instruction of the search of the disclosed information is received (step S163). If it is determined that the instruction of the search of the disclosed information is received (Yes in step S163), the control module 31 searches the disclosure unit 352 to execute the search based on the instruction received in step S163, thereby extracting the corresponding information (step S164).

The control module 31 transmits the information extracted in step S162 or step S164 to the customer terminal 2 (step S165). Then, the control module 31 terminates the process. If it is determined in step S163 that the instruction of the search of the disclosed information is not received (No in step S163), the control module 31 terminates the process.

On the other hand, the control module 21 of the customer terminal 2 determines whether or not the extraction information is received from the center server 3 (step S156). If it is determined that the extraction information is received (Yes in step S156), the control module 21 displays the extracted information in the display module 23 (step S157).

Figure 25:
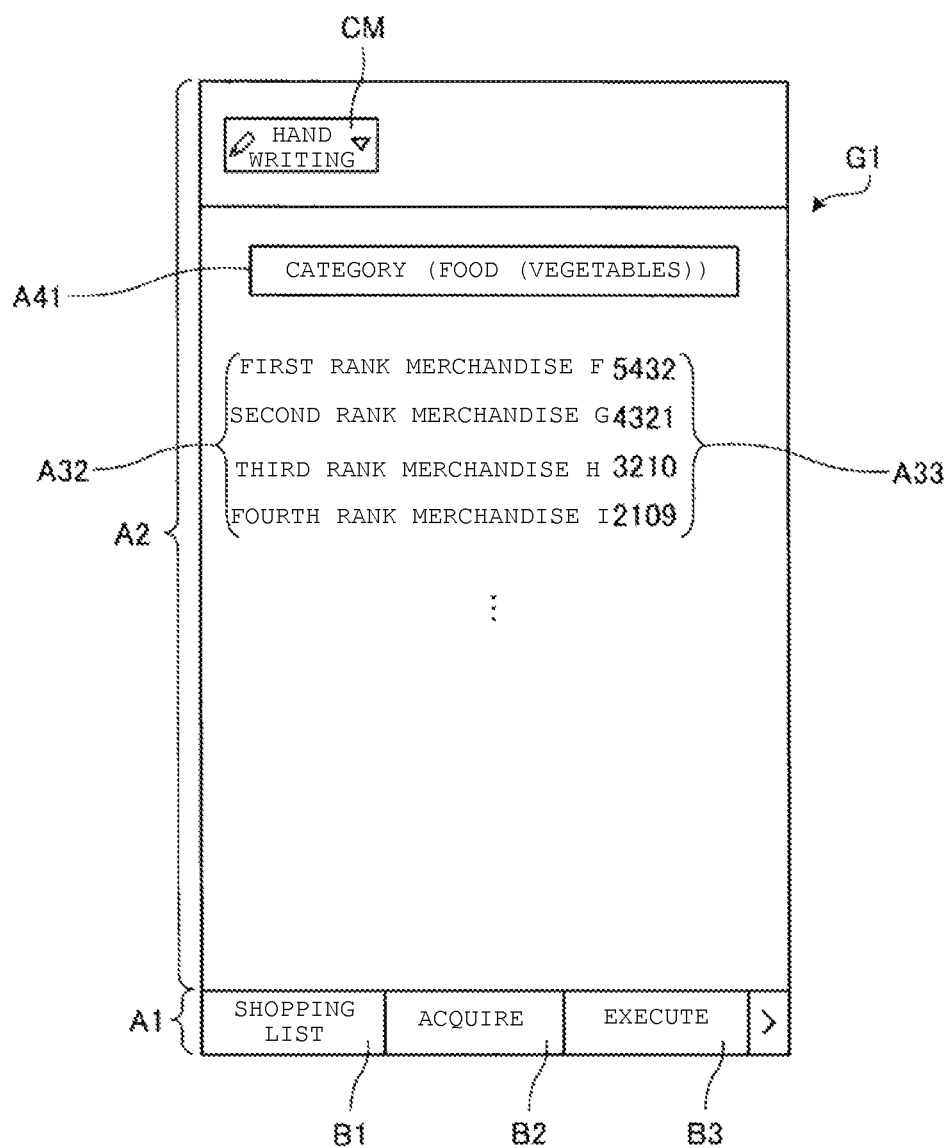
FIGS. 25-27 illustrate a screen displayed on the customer terminal.

FIG. 25 shows an example of the statistical information extracted from the statistical processing unit 351 in step S162. In FIG. 25, the display module 23 displays a category section A41 for displaying a designated category, a merchandise information section A32 for displaying the ranking information of items included in the category in the descending order from a higher ranking, and statistical information A33 indicating the number of pieces of memo information corresponding to each piece of merchandise information and the number of the item that has been purchased. Further, the display module 23 displays an execution button B3 for storing merchandise information designated through a touch operation of the customer on the memo storage unit 282 as the memo information.

Figure 26:
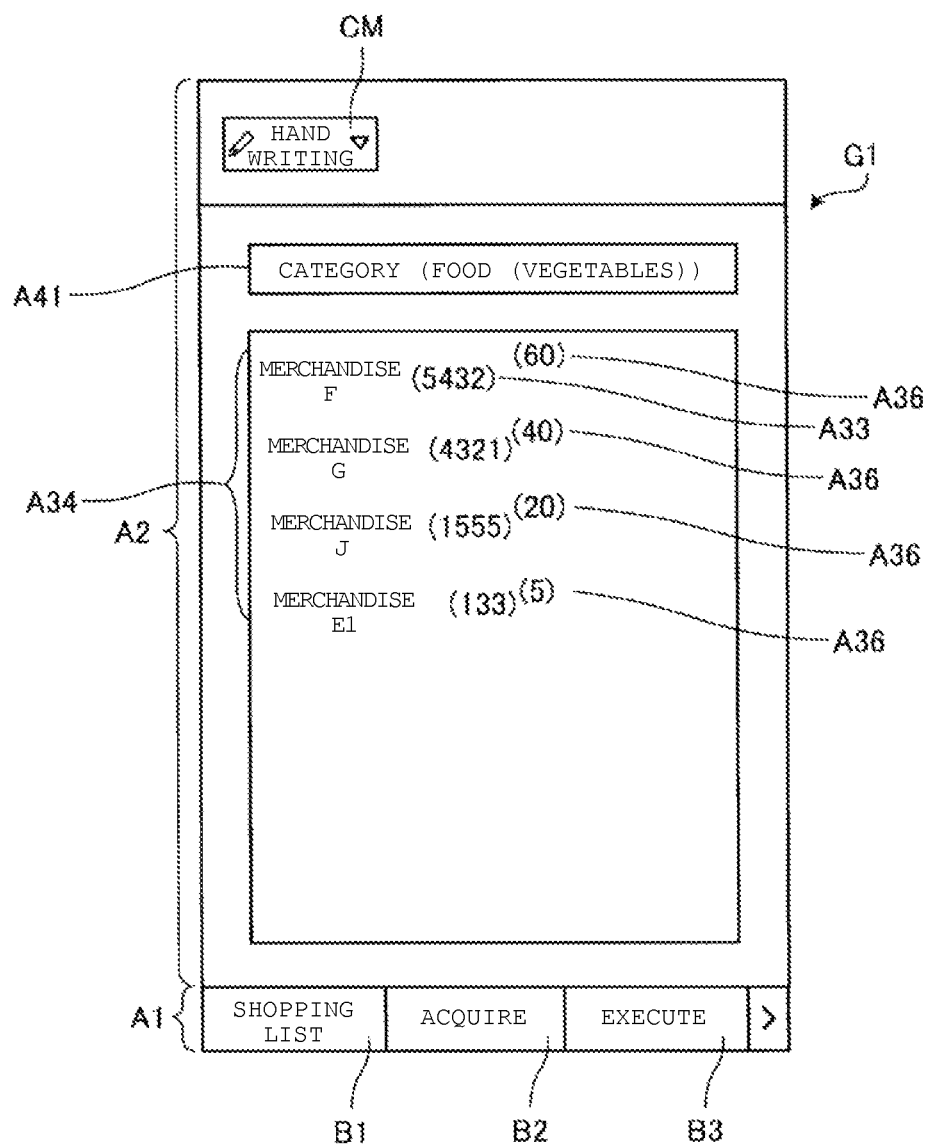

Further, FIG. 26 shows an example of the disclosed information extracted from the disclosure unit 352 in step S164. In FIG. 26, the display module 23 displays a category section A41 for displaying a designated category, and disclosed memo information A34 included in the category. Specifically, the display module 23 displays a list of displayable disclosed information, and the memo information designated from the list as it is.

Further, in FIG. 26, statistical information A33 indicating the number of pieces of memo information corresponding to each item and the number of item that has been purchased, and statistical information A36 indicating the number of icons that has been attached to the item are shown. Further, the display module 23 displays an execution button B3 operated for storing the merchandise information designated through a touch operation of the customer from the displayed merchandise information in the memo storage unit 282 as the memo information.

The customer designates one piece of merchandise information from the ranking information or the memo information displayed on the display module 23. The control module 21 determines whether or not specific merchandise information or memo information is designated (step S158). If it is determined that the specific merchandise information or memo information is designated (Yes in step S158), the control module 21 acquires the designated merchandise information or memo information (lettuce in the exemplary embodiment), and stores the result in the memo storage unit 282 (step S159). Then, the control module 21 terminates the process.

Figure 27:
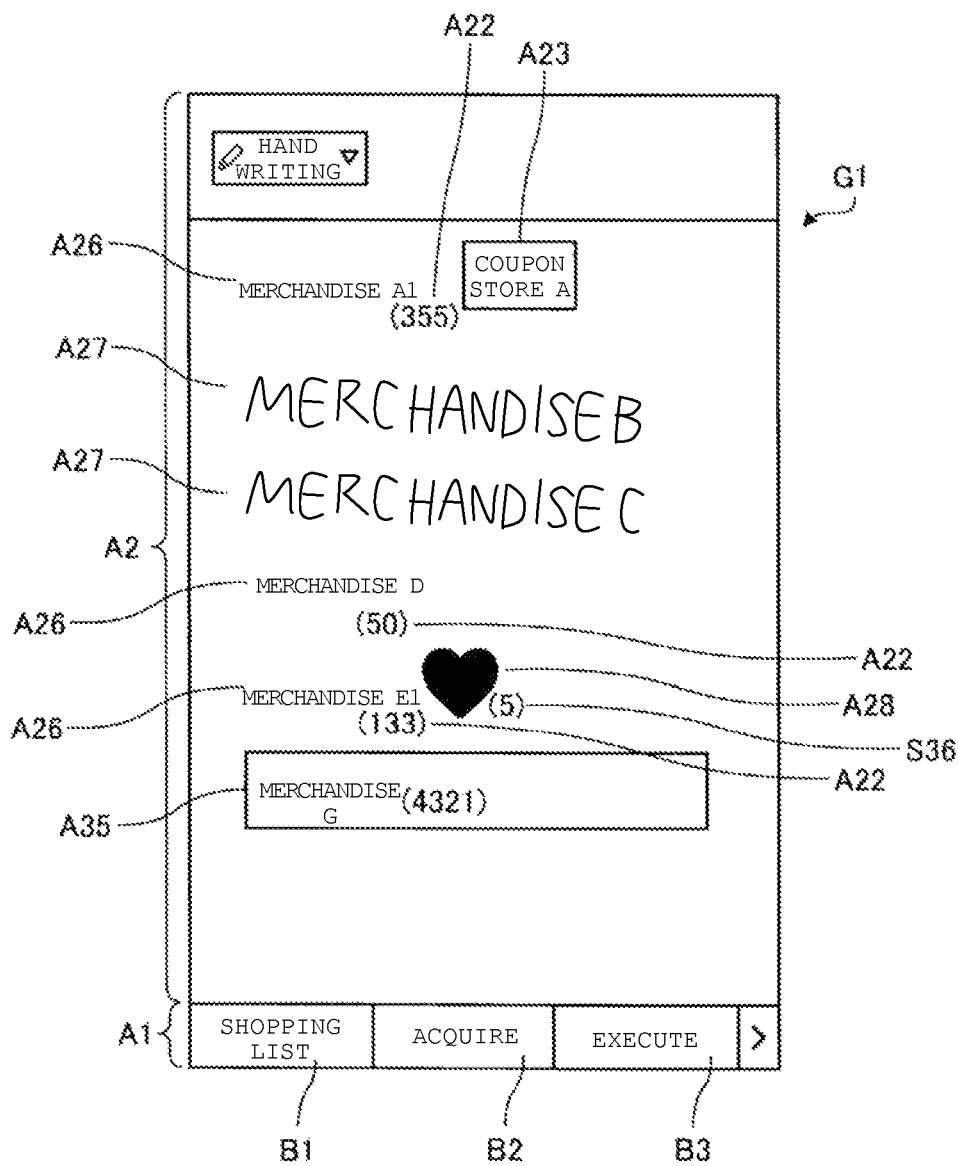

Further, the control module 21 controls the display module 23 to display the shopping list including the memo information acquired in step S159 as a new shopping list screen G1 in response to operation of the shopping list button B1. FIG. 27 shows an example of the new shopping list screen G1 including the memo information of merchandise G acquired through the screen of FIG. 26. In FIG. 27, in addition to the memo information displayed in step S14 of FIG. 11A or the memo information displayed in step S71 of FIG. 12, new memo information A35 indicating the merchandise G stored in step S159 is displayed.

According to such an exemplary embodiment, when creating a shopping list, the customer may refer to the statistical information of the item or memo information of another person. Further, the customer may capture information about a favorite item from the reference statistical information or memo information to add the information to a shopping list as the customer's own memo information.

The statistical information may be statistical information collected from an external SNS other than statistical information acquired through the shopping list screen G1 or the electronic receipt information. In this case, appropriate statistical data may be created based on information from various sources.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the exemplary embodiments, the center server 3 may include a concept of a cloud computer. That is, the center server 3 may be a server group including plural servers. For example, in order to execute various processes of the embodiments, the center server 3 may transmit information to another server to allow the server, which is a transmission destination, to execute the processes. In this configuration, the center server 3 may provide a function as "Software as a Service" (SaaS) that is a kind of cloud computing.

Further, the program executed in the respective terminals of the embodiments may be provided in a state of being assembled in advance in a ROM, a storage module or the like. In addition, the programs may be provided in a state of being recorded in a computer-readable recording medium such as a CD-ROM, a flexible disk (FD), a CD-R, or a DVD as a file of an installable format or an executable format.

Further, the program may be provided in a state of being stored on the computer connected to a network such as the Internet to be downloaded through the network. Furthermore, the program may be provided or distributed through the network such as the Internet.

What is claimed is:

1. A computing device for communicating with an external device and prompting the external device to return data relevant to user inputs made through the computing device, comprising:
a display for displaying a graphical user interface;
a communication interface for communicating with an external device; and
a processor configured by a program to carry out the steps of:
receiving a user input including a name of an object;
detecting the name of the object in the user input;
controlling the display to display the user input in the graphical user interface;
controlling the communication interface to transmit the detected name of the object to the external device;
controlling the display to display, in the graphical user interface, a registered name of the object, in place of the user input including the name of the object, in response to information returned from the external device in response to a transmission of the detected object name when the information returned from the external device includes the registered name; and
controlling the display to display a number in the graphical user interface in conjunction with the registered name of the object when the registered name and the number are included in the information returned from the external device, the number being statistical information related to the object.

2. The computing device according to claim 1, wherein the steps further comprise:
in response to the user's selection of the registered name of the object in the graphical user interface, controlling the display to display, in the graphical user interface, a plurality of marks selectable by the user to indicate the user's preference for the object; and
controlling the communication interface to transmit a one of the marks selected by the user to the external device.

3. The computing device according to claim 2, wherein the steps further comprise:
controlling the display to display, in the graphical user interface, the mark selected by the user with the registered name.

4. The computing device according to claim 2, wherein the steps further comprise:
receiving from the external device information corresponding to a total number of times the one of the marks selected by the user has been selected previously.

5. The computing device according to claim 4, wherein the steps further comprise:
controlling the display to display, in the graphical user interface, the information corresponding to the total number of times with the registered object name.

6. The computing device according to claim 5, wherein the steps further comprise:
controlling the display to display, in the graphical user interface, the mark selected by the user with the registered object name, and
the mark is displayed larger than the information corresponding to the total number of times.

7. The computing device according to claim 1, wherein the user input including the name of the object and the registered name of the object are displayed in different display formats.

8. The computing device according to claim 7, wherein the user input is a handwriting input, a handwritten name of the object is displayed in the graphical user interface as the name of the object, and
the registered name is displayed in a predetermined font.

9. The computing device according to claim 1, wherein the user input of the name of the object remains displayed in the graphical user interface when no information is returned from the external device or when the information returned from the external device includes no registered name.

\* \* \* \* \*